United States Patent
Jinno

(10) Patent No.: US 9,346,283 B2
(45) Date of Patent: May 24, 2016

(54) IMAGE FORMING APPARATUS AND METHOD

(75) Inventor: Takayuki Jinno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 21 days.

(21) Appl. No.: 13/484,923

(22) Filed: May 31, 2012

(65) Prior Publication Data

US 2012/0307273 A1    Dec. 6, 2012

(30) Foreign Application Priority Data

Jun. 3, 2011   (JP) .................. 2011-125343

(51) Int. Cl.
*H04N 1/60* (2006.01)
*B41J 2/21* (2006.01)

(52) U.S. Cl.
CPC .............. *B41J 2/2132* (2013.01); *B41J 2/2107* (2013.01); *H04N 1/6022* (2013.01); *H04N 1/6058* (2013.01); *H04N 1/6061* (2013.01); *H04N 1/6066* (2013.01); *H04N 1/6069* (2013.01)

(58) Field of Classification Search
CPC ..... H04N 1/60; H04N 1/6058; H04N 1/6061; H04N 1/6066; H04N 1/6069
USPC .................. 358/1.9–3.24, 518–525, 529–536
See application file for complete search history.

(56) References Cited

U.S. PATENT DOCUMENTS

| | | | |
|---|---|---|---|
| 5,631,748 A * | 5/1997 | Harrington | .................. 358/502 |
| 6,270,186 B1 | 8/2001 | Smith et al. | |
| 6,344,899 B1 | 2/2002 | Tabata et al. | |
| 6,750,983 B1 | 6/2004 | Miyake | |
| 6,798,538 B1 | 9/2004 | Yamada et al. | |
| 6,867,884 B1 * | 3/2005 | Rozzi | .............................. 358/1.9 |
| 6,870,644 B2 * | 3/2005 | Schramm et al. | ............ 358/3.05 |
| 6,937,360 B1 | 8/2005 | Ikeda et al. | |
| 7,397,580 B2 | 7/2008 | Kakutani | |
| 7,481,510 B2 | 1/2009 | Hirano | |
| 7,773,258 B2 | 8/2010 | Tsuchiya | |
| 7,952,617 B2 | 5/2011 | Fujino | |
| 8,199,362 B2 | 6/2012 | Yoshida | |
| 2004/0051756 A1 | 3/2004 | Takenaka | |
| 2005/0122534 A1* | 6/2005 | Kakutani | ....................... 358/1.9 |
| 2005/0231742 A1 | 10/2005 | Hirano | |

(Continued)

FOREIGN PATENT DOCUMENTS

CN    1579788 A    2/2005
CN    101552861 A    10/2009

(Continued)

OTHER PUBLICATIONS

U.S. Appl. No. 13/484,805, filed May 31, 2012, Takuya Shimada.

(Continued)

*Primary Examiner* — Richard Zhu
(74) *Attorney, Agent, or Firm* — Canon USA, Inc. IP Division

(57) ABSTRACT

A generation unit is configured to generate a plurality of pieces of chromatic color material data, for each color positioned at a surface of a dark portion in a color gamut that can be reproduced using a black color material and the plurality of chromatic color materials, in such a way as to set a number of specific colors of the plurality of chromatic color materials whose dots are arranged exclusively with dots of other chromatic color materials on a recording medium to be equal to or less than one color.

22 Claims, 44 Drawing Sheets

(56) References Cited

U.S. PATENT DOCUMENTS

| | | | |
|---|---|---|---|
| 2006/0164690 A1* | 7/2006 | Yamada et al. | 358/3.03 |
| 2006/0187254 A1 | 8/2006 | Yamanobe | |
| 2008/0106764 A1 | 5/2008 | Fujino | |
| 2009/0207451 A1* | 8/2009 | Yamada et al. | 358/3.03 |
| 2009/0244572 A1* | 10/2009 | Hansaki et al. | 358/1.9 |
| 2009/0244631 A1* | 10/2009 | Hansaki et al. | 358/3.03 |
| 2009/0310161 A1* | 12/2009 | Kawamura | 358/1.9 |
| 2011/0013205 A1 | 1/2011 | Hansaki | |
| 2012/0106835 A1 | 5/2012 | Bernal et al. | |

FOREIGN PATENT DOCUMENTS

| | | |
|---|---|---|
| CN | 101959001 A | 1/2011 |
| EP | 1072421 A2 | 1/2001 |
| JP | 6-233126 A | 8/1994 |
| JP | H10-191080 A | 7/1998 |
| JP | 2001-045302 A | 2/2001 |
| JP | 2002-331695 A | 11/2002 |
| JP | 2004-155181 A | 6/2004 |
| JP | 2004-336301 A | 11/2004 |
| JP | 2005-078317 A | 3/2005 |
| JP | 2005-088579 A | 4/2005 |
| JP | 2005-88579 A | 4/2005 |
| JP | 2007-187902 A | 7/2007 |
| JP | 2008-172628 A | 7/2008 |
| JP | 2008-273184 A | 11/2008 |
| KR | 10-2005-0046042 A | 5/2005 |

OTHER PUBLICATIONS

Notice of Allowance for U.S. Appl. No. 13/484,805, dated Apr. 22, 2015.

* cited by examiner

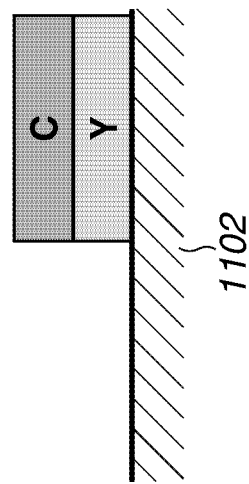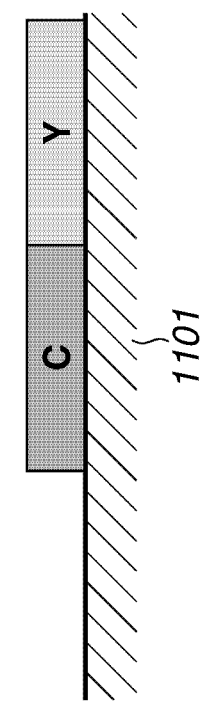
FIG.11

FIG.17

| R' | G' | B' | K | C | M | Y |
|---|---|---|---|---|---|---|
| 0 | 0 | 0 | xx | xx | xx | xx |
| 0 | 0 | 32 | xx | xx | xx | xx |
| . | . | . | . | . | . | . |
| . | . | . | . | . | . | . |
| 0 | 0 | 255 | xx | xx | xx | xx |
| 0 | 32 | 0 | xx | xx | xx | xx |
| 0 | 32 | 32 | xx | xx | xx | xx |
| . | . | . | . | . | . | . |
| . | . | . | . | . | . | . |
| 0 | 32 | 255 | xx | xx | xx | xx |
| . | . | . | . | . | . | . |
| . | . | . | . | . | . | . |
| 255 | 255 | 255 | xx | xx | xx | xx |

FIG.25

|  | 2400 dpi | | | | | | | |
|---|---|---|---|---|---|---|---|---|
| 1200 dpi | C | K | C | K | C | K | C | K |
|  | K | C/Y | K | C/Y | K | C/Y | K | C/Y |
|  | C | K | C | K | C | K | C | K |
|  | K | C/Y | K | C/Y | K | C/Y | K | C/Y |

|       | 2400 dpi |     |     |     |     |     |     |
|-------|------|-----|-----|-----|-----|-----|-----|
| 1200 dpi { K | K | K | K | C/Y | C | C | C/Y |
| K | K | K | K | C | C/Y | C/Y | C |
| C | C/Y | C/Y | C | K | K | K | K |
| C/Y | C | C | C/Y | K | K | K | K |

FIG.38A

| 1 | 9 | 4 | 12 |
|---|---|---|---|
| 13 | 5 | 16 | 8 |
| 3 | 11 | 2 | 10 |
| 15 | 7 | 14 | 6 |

FIG.38B

| 16 | 8 | 13 | 5 |
|---|---|---|---|
| 4 | 12 | 1 | 9 |
| 14 | 6 | 15 | 7 |
| 2 | 10 | 3 | 11 |

FIG.39
K = 10/16
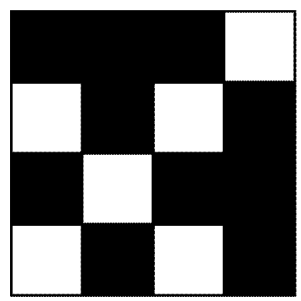
C = 6/16
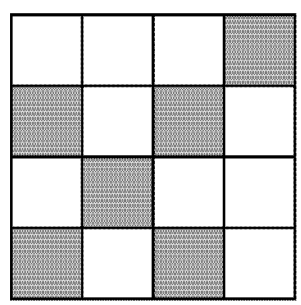
M = 0/16
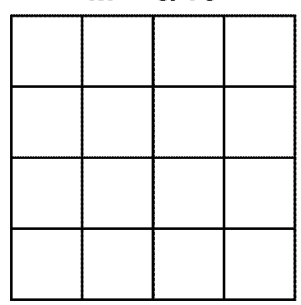
Y = 4/16
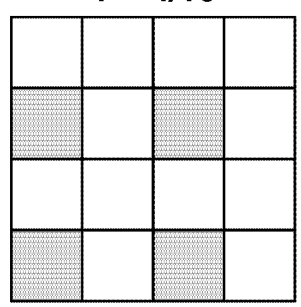

FIG.41A

| 1  | 9  | 4  | 12 |
|----|----|----|----|
| 13 | 5  | 16 | 8  |
| 3  | 11 | 2  | 10 |
| 15 | 7  | 14 | 6  |

FIG.41B

| 16 | 8  | 13 | 5  |
|----|----|----|----|
| 4  | 12 | 1  | 9  |
| 14 | 6  | 15 | 7  |
| 2  | 10 | 3  | 11 |

FIG.41C

| 1  | 9  | 4  | 12 |
|----|----|----|----|
| 13 | 5  | 16 | 8  |
| 3  | 11 | 2  | 10 |
| 15 | 7  | 14 | 6  |

FIG.41D

| 8  | 16 | 5  | 13 |
|----|----|----|----|
| 12 | 4  | 9  | 1  |
| 6  | 14 | 7  | 15 |
| 10 | 2  | 11 | 3  |

FIG.42
K = 0/16
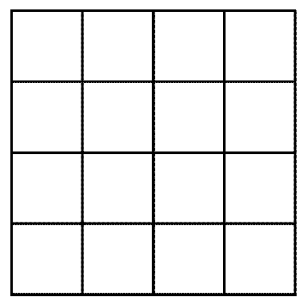
C = 8/16
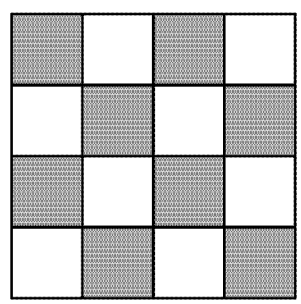
M = 0/16
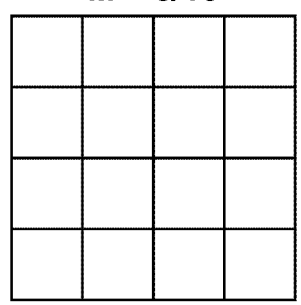
Y = 8/16
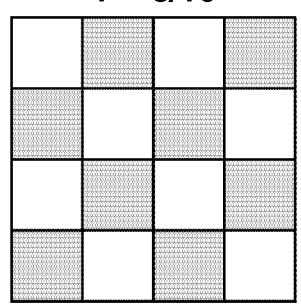

IMAGE FORMING APPARATUS AND METHOD

BACKGROUND OF THE INVENTION

1. Field of the Invention

The present invention relates to image forming processing for forming an image on a recording medium using a black color material and a plurality of chromatic color materials.

2. Description of the Related Art

The technique capable of realizing a highly developed color by enlarging the color gamut (i.e., color reproduction range) of a printer is conventionally known. As discussed in Japanese Patent Application Laid-Open No. 6-233126, it is conventionally known that particular color inks enlarging the color gamut of basic red, green, and blue colors are usable in addition to basic color inks of cyan, magenta, yellow, and black.

More specifically, it is conventionally known that a red color area of the color gamut can be enlarged by using a red ink that can reproduce a red color having a higher saturation value compared to a red color formed by overlapping a magenta dot and a yellow dot.

As discussed in Japanese Patent Application Laid-Open No. 2004-155181, it is conventionally known that a developed color formed by overlapping a yellow dot and a cyan dot in this order is different from a developed color formed in the opposite order (i.e., in order of a cyan dot and a yellow dot).

Further, it is conventionally known that the color gamut can be enlarged by designating the order of yellow and cyan in image formation when the color to be developed is reproducible only when the yellow and cyan dots are overlapped in this order. Similarly, the color gamut can be enlarged by designating the order of cyan and yellow in image formation when the color to be developed is reproducible only when the cyan and yellow dots are overlaps in this order.

As discussed in Japanese Patent Application Laid-Open No. 2005-88579, it is conventionally known that a developed color is deteriorative in properties if a red dot is overlapped with yellow and magenta dots compared to a color developed without overlapping these dots. Further, it is conventionally known that the color gamut can be enlarged by differentiating a dot layout pattern applied to red color from a dot layout pattern applied to other colors in such a way as to reduce the above-described overlapping probability, when quantized color material amount data is converted into binary data indicating formation/non-formation of a dot in relation to a predetermined dot layout pattern.

As a problem peculiar to a print product printed by a pigment inkjet printer that mainly uses pigments as coloring materials, the color gamut deteriorates at a dark portion (i.e., a low-lightness region). FIG. 1 schematically illustrates the shape of a color gamut relating to yellow hue of a print product printed by the pigment inkjet printer. In FIG. 1, the abscissa axis represents the magnitude of saturation C* and the ordinate axis represents the magnitude of lightness L* in a CIELCh color space, in which point A, point B, point C, and point D indicate colors adjacent to white, yellow, black, and color adjacent to black at the surface of the color gamut, respectively.

As illustrated in FIG. 1, the contour of the color gamut extending from yellow to black is greatly deformed inward at a dark portion (i.e., a low-lightness region), compared to a straight line connecting the point B (yellow) and the point C (black). Especially, in an area adjacent to black, the saturation does not change so largely even when the lightness changes greatly, as understood from the positional relationship between the point C and the point D. Therefore, the color gamut having a formed shape causes defective gradation (collapse) in color mapping.

In this respect, according to the techniques discussed in Japanese Patent Application Laid-Open No. 6-233126 and Japanese Patent Application Laid-Open No. 2005-88579, printers are required to have a complicated and enlarged structure due to newly added inks. Further, according to the technique discussed in Japanese Patent Application Laid-Open No. 2004-155181, the color gamut of intermediate lightness is enlarged in the hue extending from yellow to cyan via green. However, the color gamut of the dark portion (low-lightness region) extending from yellow to black cannot be enlarged.

SUMMARY OF THE INVENTION

The present invention is directed to an image forming apparatus that can enlarge the color gamut of a low-lightness region without adding a new recording material.

According to an aspect of the present invention, an image forming apparatus is configured to form an image on a recording medium using a black color material and a plurality of chromatic color materials. The image forming apparatus includes a generation unit configured to generate black color material data for arranging a dot of the black color material on the recording medium and a plurality of pieces of chromatic color material data for arranging a dot of the plurality of chromatic color materials on the recording medium, based on input image data, and a formation unit configured to form an image on the recording medium using the black color material and the plurality of chromatic color materials based on the black color material data and the plurality of pieces of chromatic color material data. The generation unit is configured to generate the plurality of pieces of chromatic color material data, for each color positioned at a surface of a dark portion in a color gamut that can be reproduced using the black color material and the plurality of chromatic color materials, in such a way as to set the number of specific colors of the plurality of chromatic color materials whose dots are arranged exclusively with dots of other chromatic color materials on the recording medium to be equal to or less than one color.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 11 schematically illustrates an example layout of a cyan ink and a yellow ink on a recording medium.

FIG. 17 schematically illustrates an example of a color separation table stored in a color separation table storage unit.

FIG. 25 schematically illustrates an image that can be obtained though the halftone processing according to the first exemplary embodiment of the present invention.

FIGS. 31A, 31B, 31C, and 31D illustrate output patterns that correspond to input levels 0 to 8, which can be obtained through conversion of a dot layout patterning processing unit.

FIG. 32 schematically illustrates an example image having been subjected to dot layout patterning processing according to the second exemplary embodiment of the present invention.

FIGS. 38A and 38B schematically illustrate example dither matrices that are usable in a fourth exemplary embodiment of the present invention.

FIG. 39 schematically illustrates examples of the dot layout of each color having been subjected to the halftone processing at the dark portion according to the fourth exemplary embodiment of the present invention.

FIGS. 41A, 41B, 41C, and 41D schematically illustrate example dither matrices that are usable in the fourth exemplary embodiment of the present invention.

FIG. 42 schematically illustrates examples of the dot layout of each color having been subjected to the halftone processing at the bright portion according to the fourth exemplary embodiment of the present invention.

DESCRIPTION OF THE EMBODIMENTS

Various exemplary embodiments, features, and aspects of the invention will be described in detail below with reference to the drawings.

In the present exemplary embodiment, recording materials are cyan, magenta, yellow, and black inks. The black ink may be referred to as a black color material. The cyan ink, the magenta ink, and the yellow ink may be collectively referred to as chromatic color materials or chromatic color inks or may be simply referred to as color inks. The black ink may be referred to as achromatic color ink. In the following description, uppercase letters C, M, Y, and K may represent respective colors or their data or hue. More specifically, "C" represents cyan color or may represent data or hue thereof. "M"

represents magenta color or may represent data or hue thereof. "Y" represents yellow color or may represent data or hue thereof. "K" represents black color or may represent data or hue thereof.

An example relationship between the spatial layout (hereinafter, referred to as "image formation") of a color material and color development on a recording medium (e.g., a paper surface) is described in detail below with reference to attached drawings.

Figure 1:
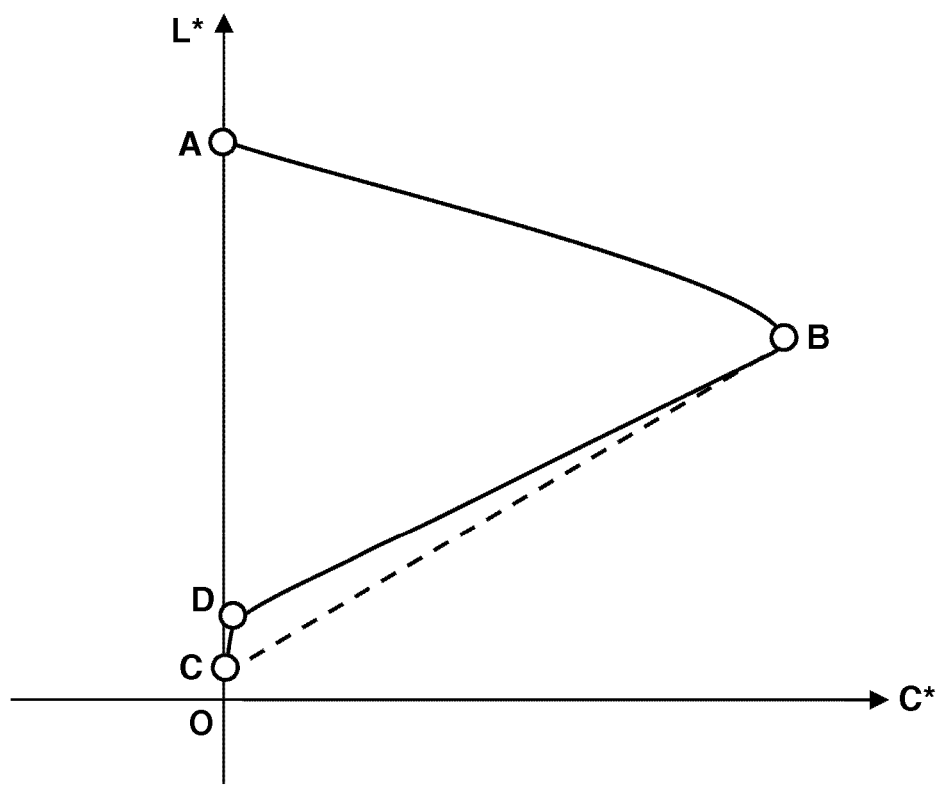
FIG. 1 schematically illustrates the shape of a color gamut relating to yellow hue of a print product printed by a pigment inkjet printer.
Figure 2:
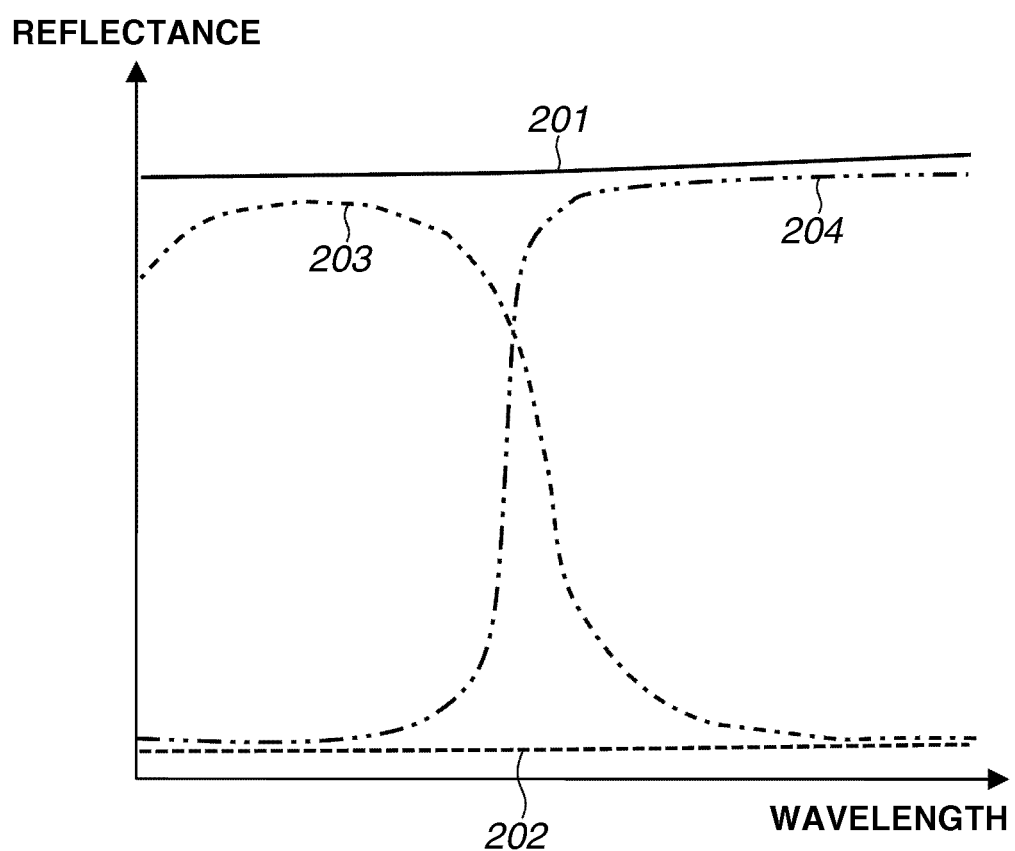
FIG. 2 is a graph illustrating spectral reflectance data relating to paper and ink.

FIG. 2 is a graph schematically illustrating spectral reflectance characteristics of paper (as an example of the recording medium) and inks (as examples of the color material), in which the abscissa axis represents the wavelength and the ordinate axis represents the reflectance. More specifically, a spectrum 201 indicates spectral reflectance characteristics of a paper, a spectrum 202 indicates spectral reflectance characteristics of a black ink, a spectrum 203 indicates spectral reflectance characteristics of a cyan ink, and a spectrum 204 indicates spectral reflectance characteristics of a yellow ink.

Figure 3:
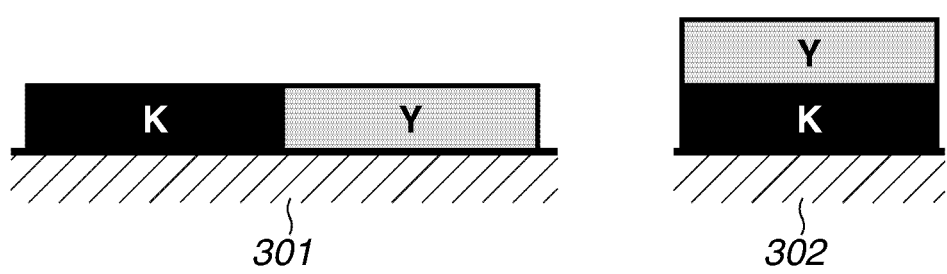
FIG. 3 schematically illustrates an example layout of a black ink and a yellow ink on a recording medium.

The color development is described below referring to an example case where inks having the reflection characteristics illustrated in FIG. 2 are differently arranged on the paper surface as illustrated in FIG. 3. A layout 301 is a "horizontally mixed color" layout, according to which a black ink and a yellow ink are not overlapped with each other and arrayed in the horizontal direction. The paper itself is not exposed in any area of the paper surface, and the paper surface is covered entirely with either one of two inks.

The color development according to the layout 301 is dependent on a weighted average of each ink with respect to area ratio, as understood from the generally known Murray-Davis formula, and can be calculated using the following formula (1).

$$R(\lambda) = S\_K \times R\_K(\lambda) + S\_Y \times R\_Y(\lambda) \quad (1)$$

$R(\lambda)$, $R\_K(\lambda)$, and $R\_Y(\lambda)$ represent the reflectance of the mixed color, the black ink, and the yellow ink at the wavelength $\lambda$, respectively. Further, $S\_K$ and $S\_Y$ represent the area ratio (having a value of 0 to 1) of the black ink and the yellow ink on the paper surface, respectively.

Further, a layout 302 is a "color material layer" layout, according to which a black ink and a yellow ink are overlapped with each other and layered in the up-and-down direction. Similar to the layout 301, the paper itself is not exposed in any area of the paper surface, and the paper surface is covered entirely with both of two inks. The color development according to the layout 302 can be calculated using the following formula (2).

$$R(\lambda) = R\_Y(\lambda) + \{T\_Y(\lambda)^2 \times R\_K(\lambda)\} / \{1 - R\_K(\lambda) \times R\_Y(\lambda)\} \quad (2)$$

$R(\lambda)$, $R\_K(\lambda)$, and $R\_Y(\lambda)$ represent the reflectance of the mixed color, the black ink, and the yellow ink at the wavelength $\lambda$, respectively. Further, $T\_Y(\lambda)$ represents the transmittance of the yellow ink.

Figure 4:
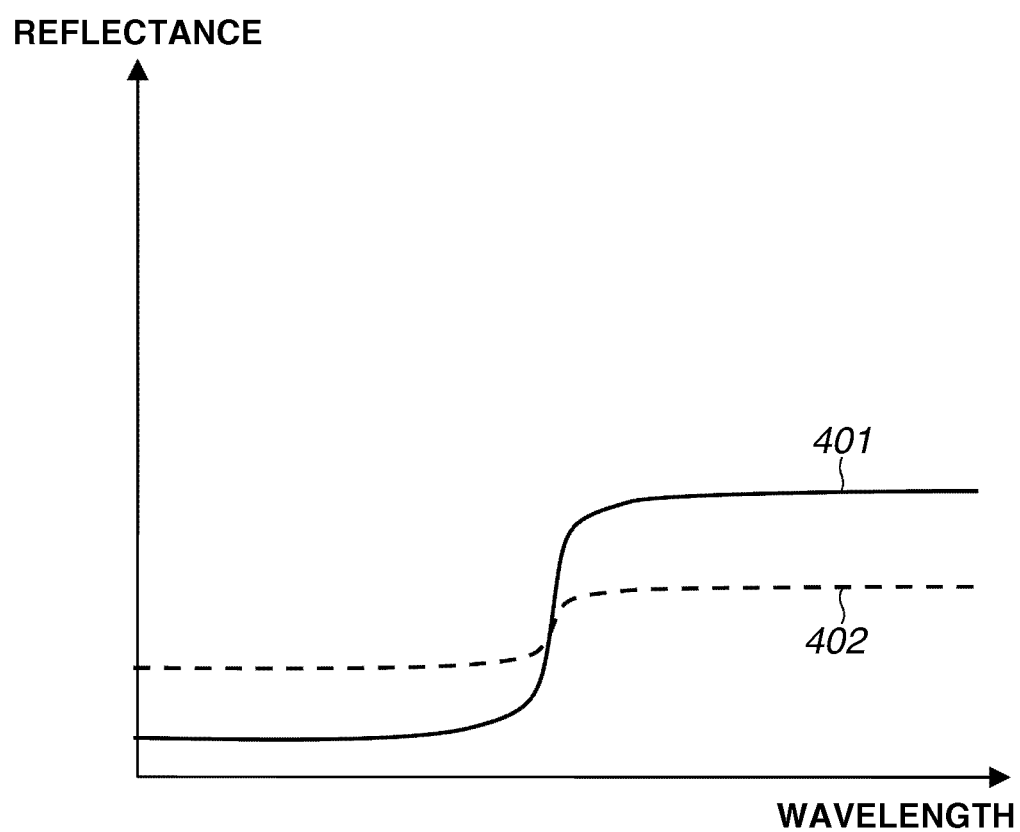
FIG. 4 is a graph illustrating spectral reflectance characteristics relating to the layout illustrated in FIG. 3.

Especially, if the ink is a pigment ink (or any other ink including a larger light scattering component compared to a dye ink), the reflectance and the transmittance are influenced by the scattering component as well as the light absorption component. FIG. 4 schematically illustrates spectral reflectance characteristics that can be calculated about the spectral reflectance characteristics illustrated in FIG. 2, using the above-described formulae (1) and (2), in a case where the selected ink is the pigment ink (i.e., the ink including a non-negligible light scattering component as described above).

A spectrum 401 indicates spectral reflectance characteristics corresponding to the layout 301. A spectrum 402 indicates spectral reflectance characteristics corresponding to the layout 302. To simplify the comparison, the area ratios S_K and S_Y are adjusted in such a way as to equalize the spectrum 401 and the spectrum 402 in lightness, although it has no influence on the determination with respect to the steepness of the spectrum. As is understood from FIG. 4, the spectrum 401 is steep in spectral reflectance change, compared to the spectrum 402.

More specifically, the black ink having a higher light absorption rate in the entire visible wavelength range and a colored ink having a lower light absorption rate partly in the visible wavelength range (hereinafter, a colored ink other than the black ink may be referred to as "color ink") have the following characteristics. If two inks are not overlapped with each other and arrayed in the horizontal direction (more specifically, the inks are mutually exclusive) as indicated by the layout 301, the reflectance value is smaller in a wavelength range in which the absorption by the color ink is large (i.e., a short wavelength side illustrated FIG. 4).

On the other hand, the reflectance value is higher in a wavelength range in which the absorption by the color ink is small (i.e., a long wavelength side illustrated FIG. 4). Therefore, the spectral reflectance changes steeply as indicated by the spectrum 401. On the other hand, if two inks are mutually overlapped and layered in the up-and-down direction as indicated by the layout 302, the reflectance value is smaller because the absorption by any one of the inks is large. Accordingly, if the black ink (i.e., the ink having a higher light absorption rate in the entire visible wavelength range) is overlapped with another ink, the reflectance value is smaller in the entire wavelength range.

In a case where only the light absorption is taken into consideration, if it is presumed that the reflectance of the black ink is constant in the entire wavelength range, the spectral reflectance value of the yellow ink if it is overlapped with the black ink in the up-and-down direction is a predetermined multiple of that of the yellow ink itself. More specifically, the steep spectrum can be maintained. Therefore, the spectral reflectance characteristics do not become lower in the entire wavelength range even if the black ink is overlapped with the yellow ink.

However, as described above, the pigment ink includes a non-negligible scattering component. The absorption component, if the absorption rate thereof is high, can lower the reflectance value. The scattering component can be added as a bias to the reflectance. Further, in general, the scattering component is large in the wavelength range where the absorption is large. Therefore, the scattering component can moderate the change in the spectral reflectance at each wavelength.

Figure 5:
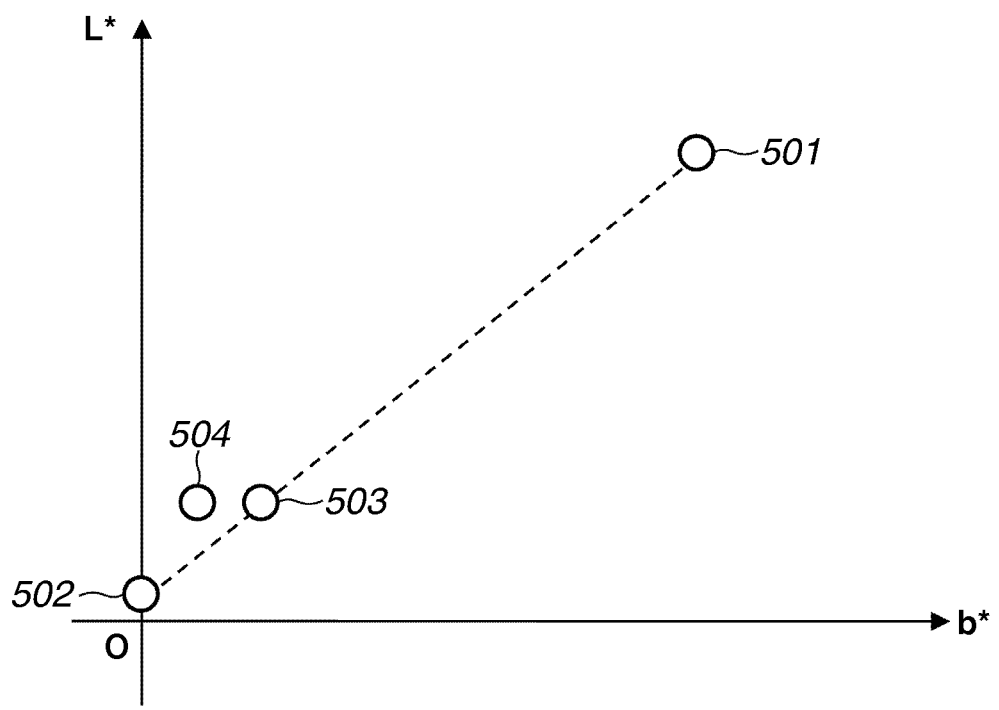
FIG. 5 is a graph illustrating example color development relevant to the layout illustrated in FIG. 3 on an L*-b* plane of a CIELab color space.

FIG. 5 illustrates color development differences that may occur due to the difference between the layout 301 and the layout 302 on the L*-b* plane of the CIELab color space. The L*-b* plane illustrated in FIG. 5 is related to the yellow hue, in which the abscissa axis represents the magnitude of b* and the ordinate axis represents the magnitude of lightness L*. In FIG. 5, a point 501 indicates a chromaticity value of yellow and a point 502 indicates a chromaticity value of black. Further, a point 503 indicates a chromaticity value that corresponds to the layout 301 and a point 504 indicates a chromaticity value that corresponds to the layout 302. The saturation value becomes higher if the distance from the lightness L* axis increases. Therefore, it is understood that the saturation value of the point 503 is higher than the saturation value of the point 504. Although FIG. 5 illustrates the characteristics based on the combination of yellow and black, similar characteristics can be obtained by a combination of cyan and black or a combination of magenta and black.

The combination of inks used in the above-described example is limited to the combination of the black ink and only one colored ink. Next, a combination of a black ink and two colored inks is described below with respect to a relationship between the spatial layout of the color material layer and the color development on the paper surface.

The spectral reflectance of each ink is similar to that described in FIG. 2. The color development is described in detail below based on example layouts illustrated in FIG. 6, in which the inks having the reflection characteristics illustrated in FIG. 2 are arranged on the paper surface. As described above, it is useful that the black ink and the color ink are not overlapped with each other and arrayed in the horizontal direction to realize high saturation in color development compared to the case where the black ink and the color ink are mutually overlapped and layered in the up-and-down direction.

Figure 6:
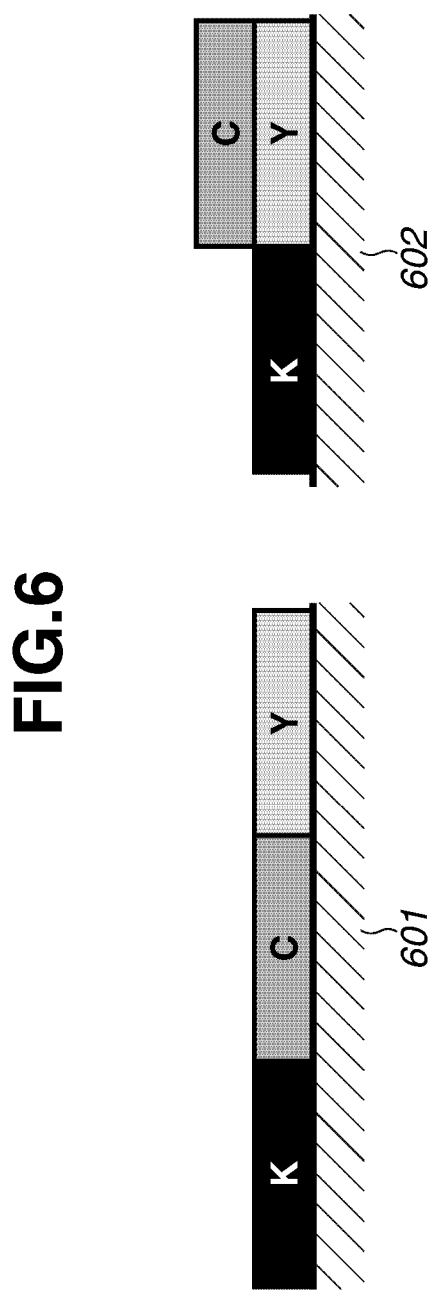
FIG. 6 schematically illustrates an example layout of a black ink and color inks on a recording medium.

According to two layouts (i.e., layout 601 and layout 602) illustrated in FIG. 6, the black ink and two color inks are exclusively arranged without being overlapped with each other. The layout 601 includes a cyan ink and a yellow ink that are not overlapped with each other and arrayed in the horizontal direction. The layout 602 includes a cyan ink and a yellow ink that are mutually overlapped and layered in the up-and-down direction.

Figure 7:
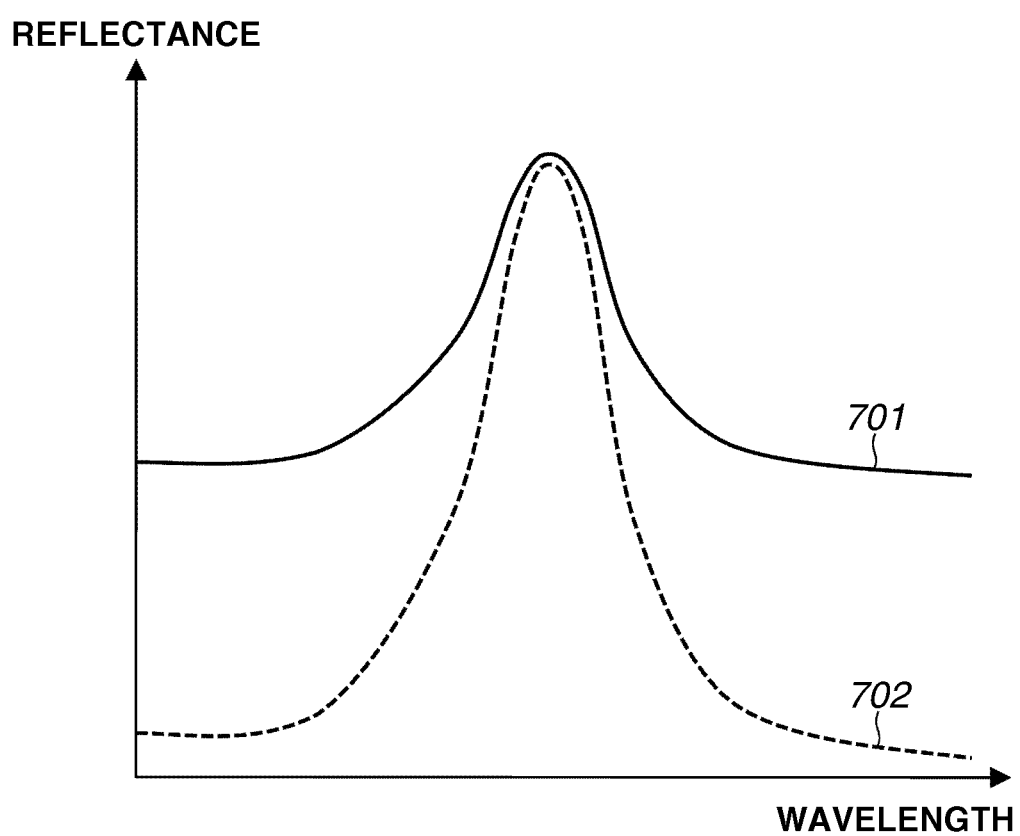
FIG. 7 is a graph illustrating spectral reflectance data of a color ink area relating to the layout illustrated in FIG. 6.

If the layout 601 is employed, the reflectance of an area where only the color ink is arranged and no black color is arranged (which may be hereinafter referred to as "color ink area") on the paper surface can be expressed as a weighted average of the spectrum 203 and the spectrum 204 illustrated in FIG. 2 that can be calculated using the above-described formula (1). On the other hand, if the layout 602 is employed, the reflectance of the color ink area including no black ink can be calculated using the above-described formula (2) based on the spectrum 203, the spectrum 204, and transmittance (not illustrated) of each ink. FIG. 7 illustrates spectral reflectance characteristics of the color ink area in each of the layout 601 and the layout 602, which can be obtained through the above-described calculations.

A spectrum 701 indicates spectral reflectance characteristics corresponding to the layout 601. A spectrum 702 indicates spectral reflectance characteristics corresponding to the layout 602. As is understood from FIG. 7, the spectrum 702 is steep in spectral reflectance change (i.e., higher in saturation), compared to the spectrum 701. More specifically, it is understood that higher saturation can be obtained in color development when the color inks are mutually overlapped and layered in the up-and-down direction compared to the case where the color inks are not overlapped with each other and arrayed in the horizontal.

Figure 8:
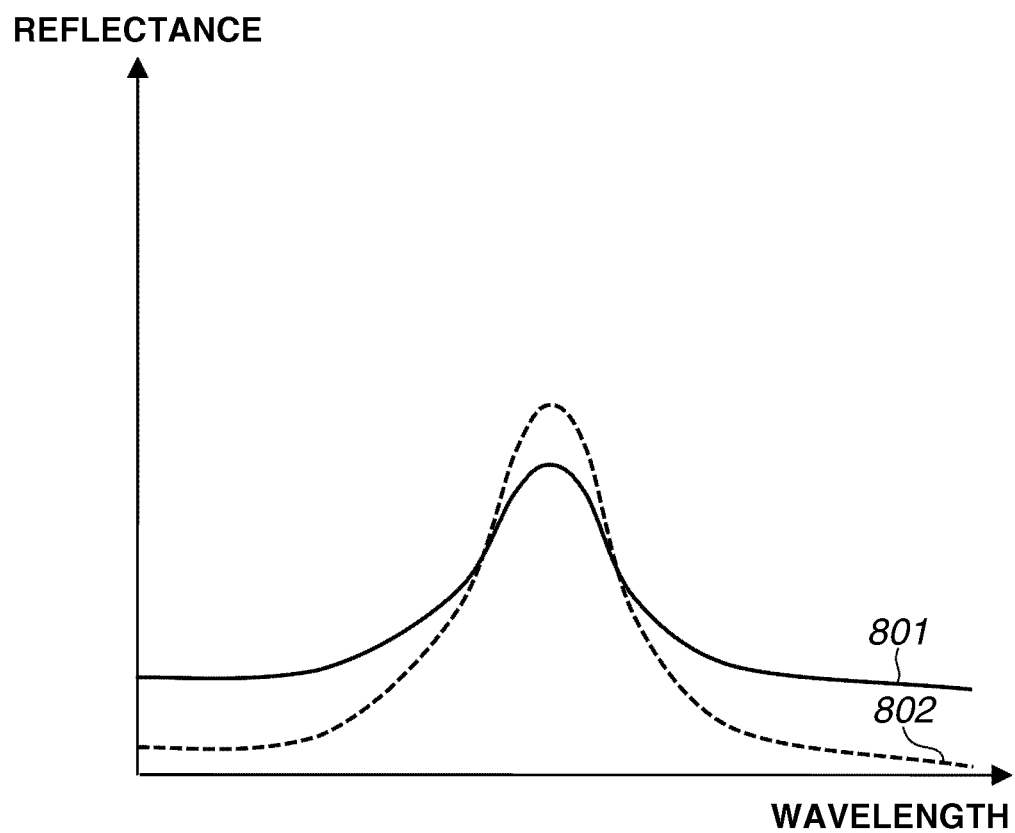
FIG. 8 is a graph illustrating spectral reflectance data relating to the layout illustrated in FIG. 6.

Further, FIG. 8 illustrates spectral reflectance characteristics of the entire area in which an arbitrary ink (including the black ink) is arranged, according to the layout 601 and the layout 602. A spectrum 801 corresponds to the layout 601, and a spectrum 802 corresponds to the layout 602. The spectral reflectance value can be calculated using the formula (1) based on the reflectance of the black ink and the reflectance of the color ink area. To simplify the comparison, an adjustment has been employed for the graph illustrated in FIG. 8 with respect to the area ratio between the black ink and the color ink area in such a way as to equalize the lightness of the layout 601 with the lightness of the layout 602, although it has no influence in the spectrums.

Figure 9:
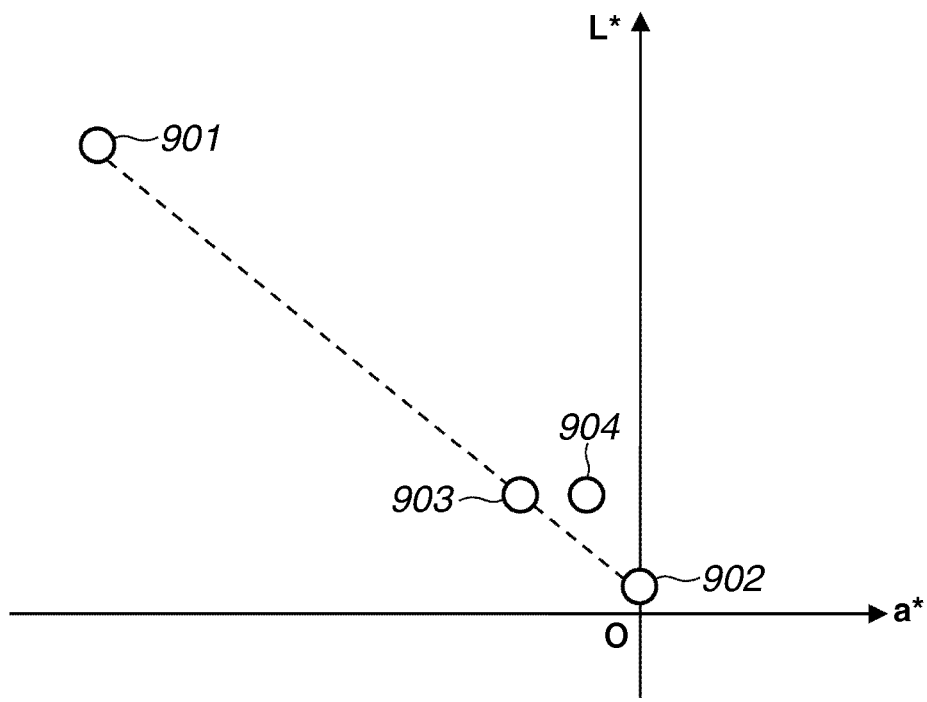
FIG. 9 is a graph illustrating example color development relevant to the layout illustrated in FIG. 6 on an L*-a* plane of the CIELab color space.

FIG. 9 illustrates color development differences that may occur due to the difference between the layout 601 and the layout 602 on the L*-a* plane of the CIELab color space. The L*-a* plane illustrated in FIG. 9 is related to the green hue, in which the abscissa axis represents the magnitude of a* and the ordinate axis represents the magnitude of lightness L*. In FIG. 9, a point 901 indicates the chromaticity of green, a point 902 indicates the chromaticity of black, a point 903 indicates the chromaticity of the layout 602, and a point 904 indicates the chromaticity of the layout 301.

If the distance from the axis of the lightness L* increases, the saturation becomes higher. Thus, it is understood that the point 903 is higher in saturation than the point 904. Although the example illustrated in FIG. 9 is the color gamut of a dark portion ranging from green (i.e., a mixed color of cyan and yellow) to black, similar characteristics can be obtained even when the dark portion ranges from red (i.e., a mixed color of yellow and magenta) to black or from blue (i.e., a mixed color of magenta and cyan) to black.

Although the examples using the L*-a* plane and the L*-b* plane have been described, when the number of chromatic colors (which may be hereinafter referred to as "exclusive colors") that are recorded exclusively without being overlapped with other dots is equal to or less than one color, it is feasible to reproduce a high saturation color as described below based on an example using an a*-b* plane of the CIELab color space.

Figure 10:
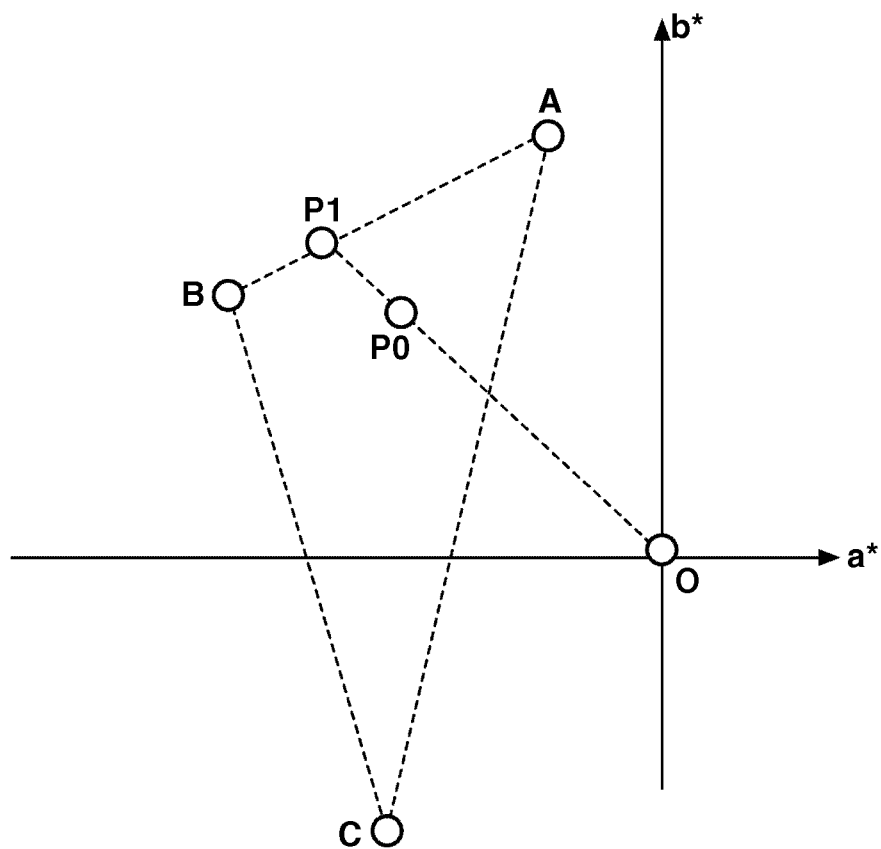
FIG. 10 is a graph illustrating an overlapped state of inks in relation to the chromaticity of an image on an a*-b* plane of the CIELab color space.

FIG. 10 schematically illustrates an example relationship between an overlapped state of inks and a chromaticity of image, in which the abscissa axis represents the magnitude of a* and the ordinate axis represents the magnitude of b* in the CIELab color space. In FIG. 10, point A indicates a color obtainable when all pixels are formed using only Y dots, point B indicates a color obtainable when all pixels are formed by overlapping Y dots and C dots, point C indicates a color obtainable when all pixels are formed using only C dots, and point O indicates an achromatic color.

A point on a line segment AB indicates a color of the first image that includes first pixels formed using only Y dots and second pixels formed using Y dots and C dots. Similarly, a point on a line segment BC indicates a color of the second image that includes the second pixels and third pixels formed using only C dots. Further, a point in a triangle ABC indicates a color of a third image that includes the first pixels, the second pixels, and the third pixels.

The saturation of the above-described each point can be defined by the distance from the point O. Therefore, when point PO positioned in the triangle ABC is compared with point P1 on the line segment AB, the distance from the point O to the point P0 is shorter than the distance from point P0 to the point P1. In other words, the color indicated by the point P0 is lower in saturation compared to the color indicated by the point P1. On the other hand, the color indicated by the point P0 is similar to the color indicated by the point P1 in hue angle. More specifically, the color of the third image is lower in saturation compared to the color of the first image although these colors are identical to each other in hue angle. Similarly, the color of the third image is lower in saturation compared to the color of the second image although these colors are identical to each other in hue angle.

In the present example, the third image includes a plurality of exclusive colors (e.g., two colors formed using Y dots and C dots). On the other hand, each of the first image and the second image includes only one exclusive color. More specifically, when the chromatic color material dots are arranged in such a way as to set the number of the exclusive colors to be equal to or less than one color, it is feasible to reproduce a high saturation color compared to the image including a plurality of chromatic colors, such as the third image.

As described above, the following three conditions contribute to enlarging the color gamut at a dark portion where the black ink is used, at the surface of the color gamut. More specifically, the first condition is that the black ink and each color ink are arranged exclusively. The second condition is that the number of color inks that are not overlapped with each other and arranged exclusively is equal to or less than one color. The third condition is that the paper white is substantially covered with any one of the inks. Regarding the technical terminology "exclusive", two dots are mutually exclusive if the center of one dot is not overlapped with the center of the other dot.

In an area other than the surface of the color gamut of the dark portion, the color gamut does not vary substantially even when the color inks are exclusive or even when they are overlapped with each other. In general, lower-lightness dots are arranged in the area where the color inks are mutually overlapped. Therefore, the dots are visually noticeable and the graininess decreases. Thus, in the area other than the surface of the color gamut of the dark portion, it is useful to arrange different inks exclusively to obtain an excellent image.

Further, although the color gamut cannot be enlarged so much, it is useful that the number of exclusive colors is equal to or less than one color and the color ink is overlapped with the black ink.

An example ink layout with respect to the color gamut of a bright portion using no black ink is described below. In the following description, the spectral reflectance of each ink is similar to that illustrated in FIG. 2. If the employed layout on the paper surface is a layout 1101 or a layout 1102 illustrated in FIG. 11, the color ink area in each layout has the spectral reflectance characteristics illustrated in FIG. 7 as described above.

Figure 12:
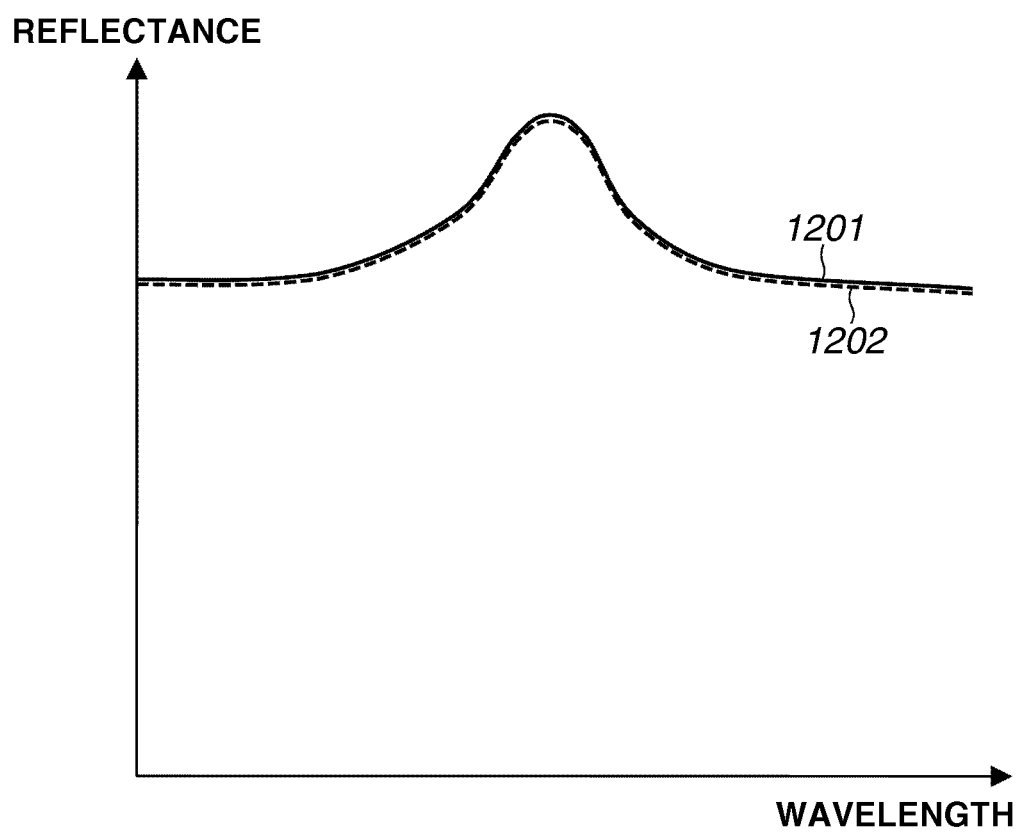
FIG. 12 is a graph illustrating spectral reflectance data relating to the layout illustrated in FIG. 11.

FIG. 12 illustrates spectral reflectance characteristics of the layout 1101 and the layout 1102 (each including an area where the paper white is exposed), which can be calculated as weighted averages based on the reflectance of the paper white. More specifically, if there is an area where the paper white is exposed and not covered with any ink, the spectral reflectance of the entire area changes moderately. Therefore, it is understood that the saturation of the entire image decreases when Y is replaced by W in the formula (1).

However, as understood from a spectrum 1201 and a spectrum 1202, the layout 1101 and the layout 1102 are substantially similar in the spectral reflectance characteristics. In this example, an adjustment has been employed for the graph illustrated in FIG. 12 with respect to the area ratio between the paper white exposure area and each color ink area in such a way as to equalize the lightness of the layout 1101 with the lightness of the layout 1102, although it has no influence in identifying a steep spectrum.

Figure 13:
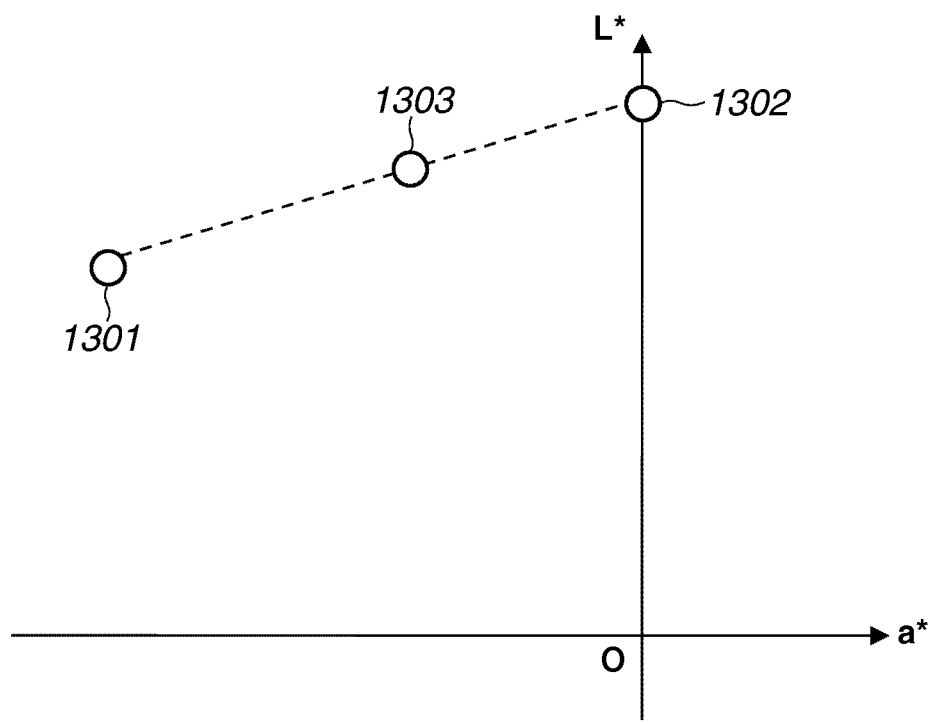
FIG. 13 is a graph illustrating example color development relevant to the layout illustrated in FIG. 11 on the L*-a* plane of the CIELab color space.

Further, FIG. 13 illustrates example color development on the L*-a* plane of the CIELab color space that can be obtained by the layout 1101 and the layout 1102. The L*-a* plane illustrated in FIG. 13 is related to the green hue, in which the abscissa axis represents the magnitude of a* and the ordinate axis represents the magnitude of lightness L*. In FIG. 13, a point 1301 indicates the chromaticity of green, a point 1302 indicates the chromaticity of the paper white, and a point 1303 indicates the chromaticity of each of the layout 1101 and the layout 1102.

As apparent from the spectral reflectance characteristics illustrated in FIG. 12, the saturation does not vary at the bright portion where no black ink is used even when the color inks are mutually overlapped and layered in the up-and-down direction, or even when the color inks are not overlapped with each other and arrayed in the horizontal direction. Although the example illustrated in FIG. 13 is the color gamut of a bright portion ranging from the paper white to green (i.e., a mixed color of cyan and yellow), similar characteristics can be obtained even when the bright portion ranges from the paper white to red (i.e., amixed color of yellow and magenta) or from the paper white to blue (i.e., a mixed color of magenta and cyan). Further, similar characteristics can be obtained even when the bright portion ranges from the paper white to one of cyan, magenta, and yellow.

Accordingly, in a case where the graininess on the paper surface decreases if color inks are mutually overlapped and layered in the up-and-down direction, it is desired that the color inks are not overlapped with each other and arrayed in the horizontal direction in a bright portion where no black ink is used.

Figure 14:
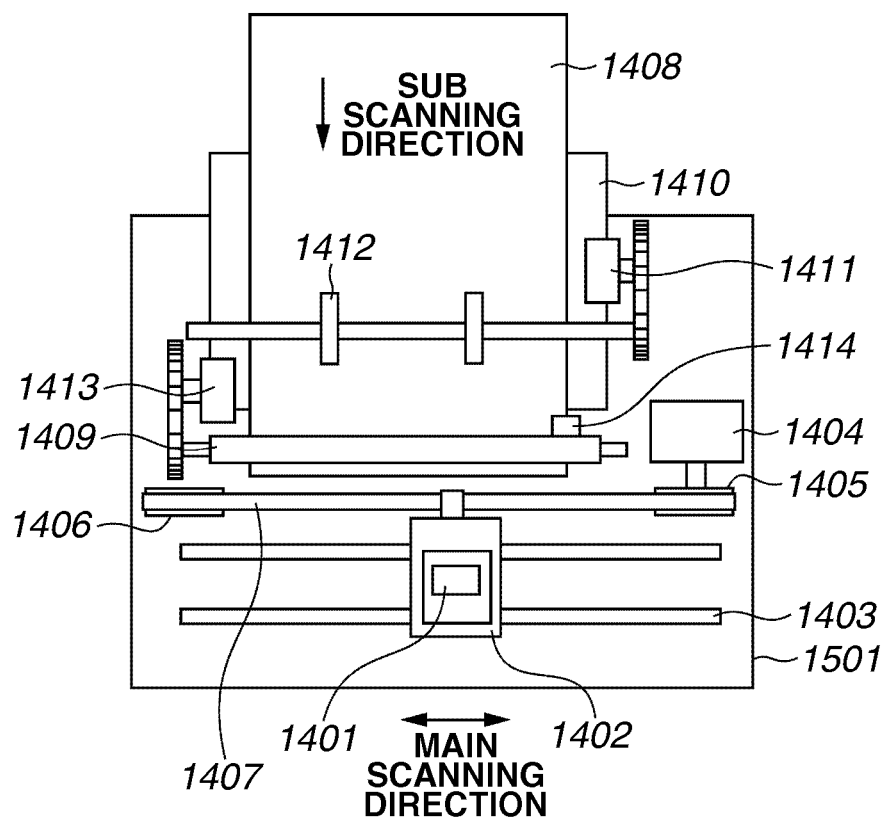
FIG. 14 illustrates a schematic configuration of an image forming apparatus according to a first exemplary embodiment of the present invention.

First, an image forming apparatus according to the first exemplary embodiment is described in detail below with reference to FIG. 14. An image forming apparatus 1501 illustrated in FIG. 14 includes a head cartridge 1401 that accommodates a recording head and ink tanks integrated together. The head cartridge 1401 is attachable to or detachable from a carriage 1402. More specifically, the head cartridge 1401 includes the recording head that has a plurality of discharge ports and a plurality of ink tanks capable of supplying a plurality of inks to the recording head. The head cartridge 1401 further includes a connector that can transmit or receive a signal to drive each discharge port of the recording head.

The carriage 1402 includes a connector holder that can transmit a signal to the head cartridge 1401 via the above-described connector. The carriage 1402 is movable in the back-and-forth direction along a guide shaft 1403. More specifically, a main scanning motor 1404 (serving as a driving source) can drive the carriage 1402 via a driving mechanism (e.g., a motor pulley 1405, a driven pulley 1406, and a timing belt 1407) in such a way as to control the position and movement of the carriage 1402.

The head cartridge 1401 mounted on the carriage 1402 includes a discharge port surface that protrudes downward from the carriage 1402 and is held to be parallel to a recording medium 1408. In the present exemplary embodiment, the movement along the guide shaft 1403 of the carriage 1402 is referred to as "main scanning" and the moving direction is referred to as "main scanning direction."

The recording medium 1408 (e.g., a print paper) is held on an automatic sheet feeder (i.e., ASF) 1410. In an image forming operation, a paper feed motor 1411 drives (rotates) pickup rollers 1412 via meshing gears to separate and convey each sheet of the recording medium 1408 from the ASF 1410 to a recording start position. While a conveyance roller 1409 keeps rotating, the leading edge of the conveyed recording medium 1408 is guided to the recording start position at which the recording medium 1408 faces the discharge port surface of the head cartridge 1401 mounted on the carriage 1402.

An LF motor 1413 can rotate the conveyance roller 1409 via meshing gears. A paper end sensor 1414 can detect the recording medium 1408 when the recording medium 1408 is conveyed beyond the recording start position.

The image forming operation can be performed in the following manner. First, the recording medium 1408 is conveyed to a predetermined position (i.e., the recording start position). Then, the carriage 1402 moves along the guide shaft 1403 while keeping a predetermined clearance relative to the recording medium 1408. When the carriage 1402 is moving along the guide shaft 1403, the recording head discharges an ink droplet from each discharge port thereof in response to a discharge port driving signal.

When the carriage 1402 reaches one end of the guide shaft 1403, the conveyance roller 1409 conveys the recording medium 1408 by a predetermined amount in a direction perpendicular to the scanning direction of the carriage 1402. Hereinafter, the above-described operation by the conveyance roller 1409 is referred to as "paper feeding" or "sub scanning." The above-described conveyance direction (i.e., the direction perpendicular to the scanning direction of the carriage 1402) is referred to as "paper feeding direction" or "sub scanning direction." The carriage 1402 restarts moving along the guide shaft 1403 when the conveyance of the recording medium 1408 by the predetermined amount terminates. An image can be recorded on the entire surface of the recording medium 1408 while the scanning and paper feeding operations are repetitively performed by the carriage 1402 of the recording head as described above.

Figure 15:
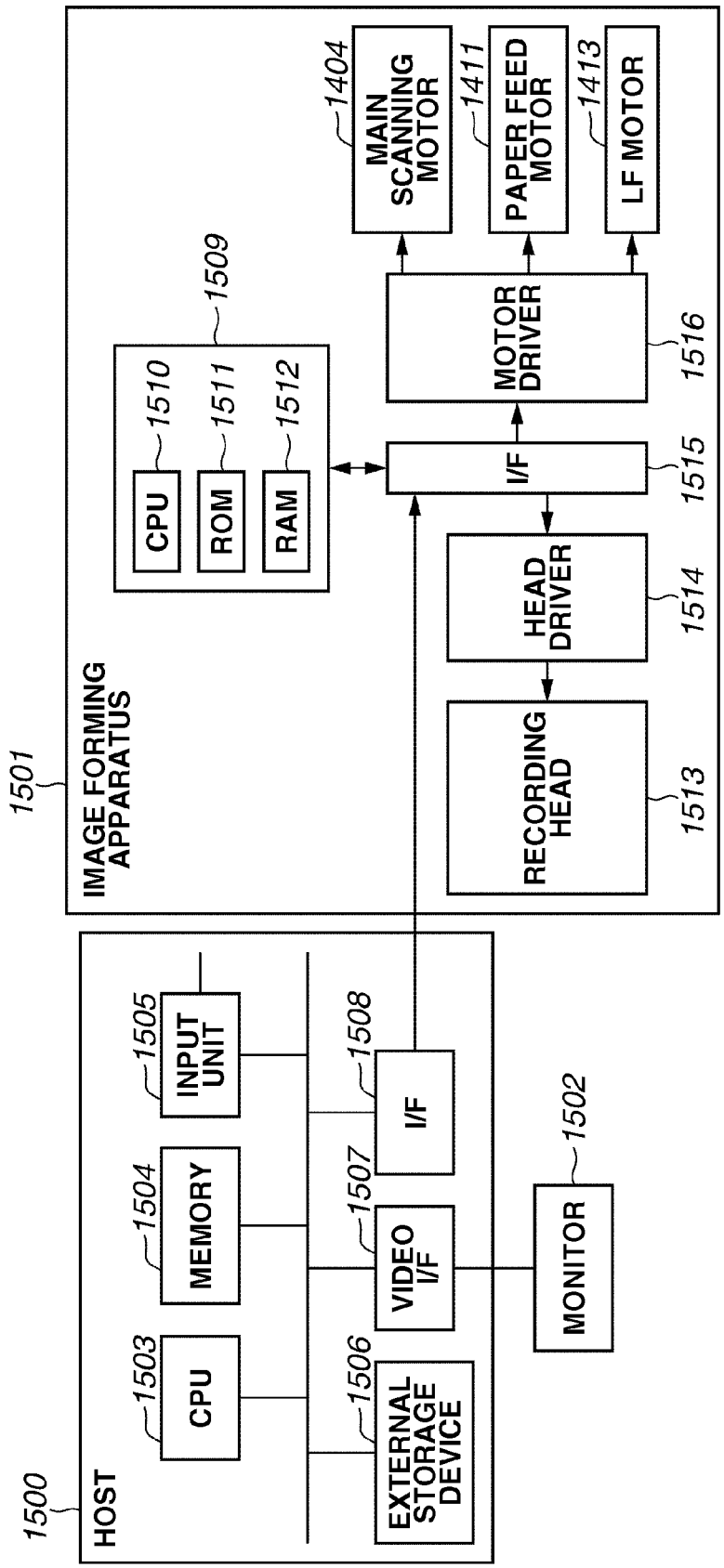
FIG. 15 is a block diagram illustrating a schematic configuration of an image forming system according to the first exemplary embodiment of the present invention.

Next, a hardware configuration of an image forming system according to the first exemplary embodiment is described in detail below with reference to a block diagram illustrated in FIG. 15. For example, a host 1500 serving as an image processing apparatus can be realized by a personal computer. The host 1500 includes a central processing unit (CPU) 1503, a memory 1504, an input unit 1505 (such as a keyboard), an external storage device 1506, an interface (hereinafter, referred to as "I/F") 1508 that can perform communications with the image forming apparatus 1501, and a video I/F 1507 that can perform communications with a monitor 1502.

The CPU 1503 is functionally operable as an image generation unit configured to execute various types of processing according to programs loaded from the memory 1504 and can execute image processing according to the present exemplary embodiment. These programs can be stored as a printer driver, for example, in the external storage device 1506, or can be supplied from an externally connected device. The CPU 1503 can appropriately read and execute the printer driver using the memory 1504 (usable as a work area).

The host 1500 can output various types of information to the monitor 1502 via the video I/F 1507. The host 1500 can input various types of information via the input unit 1505. Further, the host 1500 can transmit print data to the image forming apparatus 1501 via the I/F 1508. The print data includes image data having been subjected to the image processing.

The image forming apparatus 1501 includes a control unit 1509. The control unit 1509 includes a CPU 1510 that can execute various types of processing, a ROM 1511 that stores control programs and various types of data, and a RAM 1512 that is usable as a work area for the CPU 1510. Further, the image forming apparatus 1501 includes an interface 1515, a motor driver 1516, and a head driver 1514. The interface 1515 can communicate with the host 1500. The motor driver 1516 can drive various motors, such as the main scanning motor 1404, the paper feed motor 1411, and the LF motor 1413. The head driver 1514 can drive a recording head 1513. Further, the control unit 1509 is functionally operable as an image formation unit according to the present exemplary embodiment. More specifically, when the control unit 1509 receives print data from the host 1500, the control unit 1509 executes image processing on the received print data and controls the motors and the recording head 1513 via the drivers to record an image.

Figure 16:
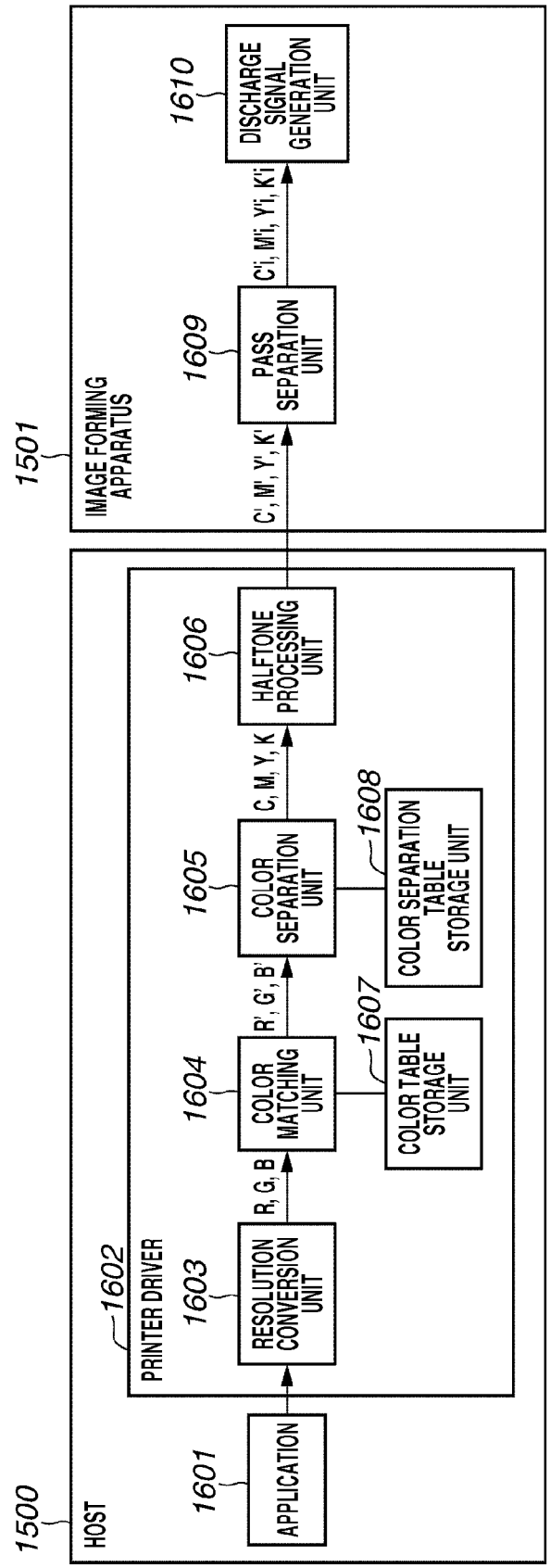
FIG. 16 is a block diagram schematically illustrating an image processing configuration according to the first exemplary embodiment of the present invention.

Next, example image processing that can be executed by the image forming system according to the first exemplary embodiment is described in detail below with reference to a block diagram illustrated in FIG. 16. The host 1500 includes a printer driver 1602 that is operable to convert input image data, if it is received from an application program 1601, into print data and output the print data to the image forming apparatus 1501. The conversion from the input image data to the print data can be realized by a resolution conversion unit 1603, a color matching unit 1604, a color separation unit 1605, and a halftone processing unit 1606.

The image forming apparatus 1501 includes a pass separation unit 1609 and a discharge signal generation unit 1611. If the image forming apparatus 1501 receives print data from the printer driver 1602, the pass separation unit 1609 and the discharge signal generation unit 1611 convert the print data into ink discharge signals to enable the recording head 1513 to record an image on the recording medium 1408. Example processing that can be performed by each unit is described in detail below. The above-described image processing to be executed by the host 1500 can be partly executed by the image forming apparatus 1501, if it is desirable.

The resolution conversion unit 1603 can convert the input image data to have the resolution of the image forming apparatus 1501 when it is output. In the present exemplary embodiment, the input image data is, for example, 8-bit RGB data of 600 dpi. The resolution of the image forming apparatus 1501 is 2400 dpi in the main scanning direction and 1200 dpi in the sub scanning direction. In this case, the input image data is expressed as an assembly of pixels each having the width of 1/600 inch. Each pixel takes a value of 0 to 255. The input image data is composed of three types of, i.e., red (R), green (G), and blue (B), color signals. The resolution conversion unit 1603 converts the above-described input image data into image data of 2400 dpi in the main scanning direction and 1200 dpi in the sub scanning direction using a conventionally known resolution conversion method, such as bi-cubic convolution.

The color matching unit 1604 can convert an input color signal (R, G, B), i.e., the image data received from the resolution conversion unit 1603, into an output color signal (R', G', B') that depends on the image forming apparatus 1501 with reference to a color table stored in a color table storage unit 1607. The values R', G', and B' of the color signal (R', G', B') are 8-bit data respectively, which takes a value from 0 to 255. The color table stored in the color table storage unit 1607 includes a description relating to discrete color signals (R, G, B) and relevant color signals (R', G', B').

A conventionally known three-dimensional lookup table method (hereinafter 3DLUT method) using an appropriate color table is employable to calculate the color signals (R', G', B') . It is desired to prepare a plurality of color tables and select an appropriate color table considering the type of a recording medium or the purpose of image formation.

The color separation unit 1605 can convert the above-described color signal (R', G', B') into a color material amount signal (C, M, Y, K) to be output with reference to a color separation table stored in a color separation table storage unit 1608. The color material amount signal (C, M, Y, K) indicates the number of recording dots of each color material and may be hereinafter referred to as "color material amount data." The color material amount signal (C, M, Y, K) is, for example, a 8-bit signal. Each of C, M, Y, and K takes a value in the range from 0 to 255.

If the color material amount signal (C, M, Y, K) is (0, 20, 100, 255), the formation probability is 0/255 for C dots, 20/255 for M dots, 100/255 for Y dots, and 255/255 for K dots. More specifically, if the total number of pixels that constitute an image is "n", the number of pixels allocated to each color is 0/255×n pixels for C dots, 20/255×n pixels for M dots, 100/255×n pixels for Y dots, and 255/255×n pixels for K dots. For example, in the case where the color material amount signal (C, M, Y, K) applied to a total of 256 pixels (16 pixels in each of the vertical and horizontal directions) is (0, 20, 100, 255), an image obtained through image formation includes no C dots, 20 M dots, 100 Y dots, and 256 K dots.

FIG. 17 schematically illustrates an example of the color separation table stored in the color separation table storage unit 1608. As illustrated in FIG. 17, the color separation table is a three-dimensional lookup table (hereinafter, referred to as "3DLUT") that stores color material amount signals (C, M, Y, K) that correspond to discrete color signals (R', G', B'). According to the illustrated example, the color separation table stores color material amount signals that correspond to color signals of 729 (=$9^3$) grid points whose R', G', and B' are any one of nine values (i.e., 0, 32, 64, 96, 128, 160, 192, 224, and 255).

If a color signal R'G'B' in supplied from the color matching unit 1604 is a color signal described in the 3DLUT, the color separation unit 1605 searches a corresponding color material amount signal CMYKout from the 3DLUT and outputs the color material amount signal CMYKout to the halftone processing unit 1606. On the other hand, if the input color signal R' G' B' in is not present in the 3DLUT, the color separation unit 1605 calculates a corresponding color material amount signal CMYKout using a conventionally known 3DLUT method (i.e., interpolation processing) and outputs the calculated color material amount signal CMYKout to the halftone processing unit 1606.

Figure 18:
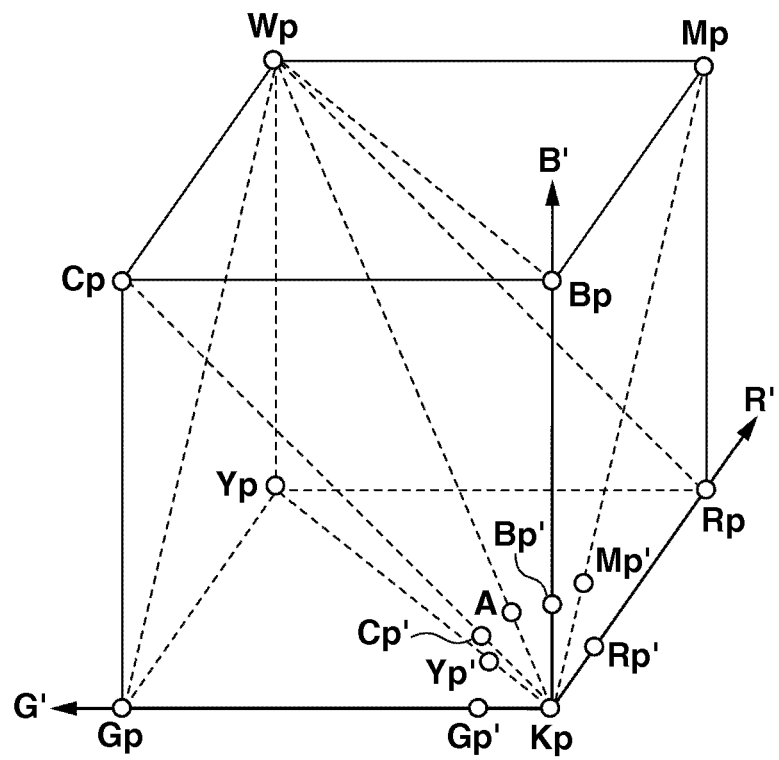
FIG. 18 schematically illustrates an example color space (R', G', B').

FIG. 18 schematically illustrates an example color space (R', G', B'). In FIG. 18, Wp, Cp, Mp, Yp, Rp, Gp, Bp, and Kp can be defined by the following signal values.

$$Wp=(R', G', B')=(255, 255, 255) \quad (3)$$

$$Cp=(R', G', B')=(0, 255, 255) \quad (4)$$

$$Mp=(R', G', B')=(255, 0, 255) \quad (5)$$

$$Yp=(R', G', B')=(255, 255, 0) \quad (6)$$

$$Rp=(R', G', B')=(255, 0, 0) \quad (7)$$

$$Gp=(R', G', B')=(0, 255, 0) \quad (8)$$

$$Bp=(R', G', B')=(0, 0, 255) \quad (9)$$

$$Kp=(R', G', B')=(0, 0, 0) \quad (10)$$

The color represented by a color material signal that corresponds to a color signal on the surface of a cubic R'G'B' color space constitutes a surface of the color gamut. The color gamut of a dark portion relates to a color signal of the black-color line connecting a vertex Kp to each of vertices Cp, Mp, Yp, Rp, Gp, and Bp.

Figure 19A:
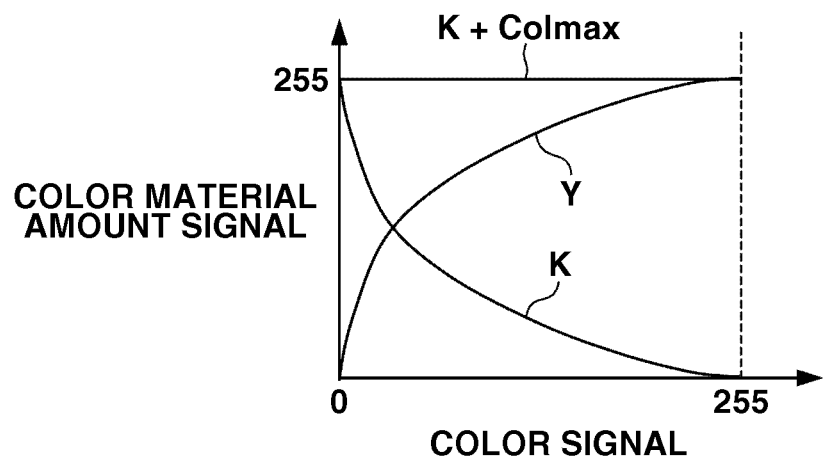
FIGS. 19A and 19B schematically illustrate color separation tables of black-color line according to the first exemplary embodiment of the present invention.
Figure 19B:
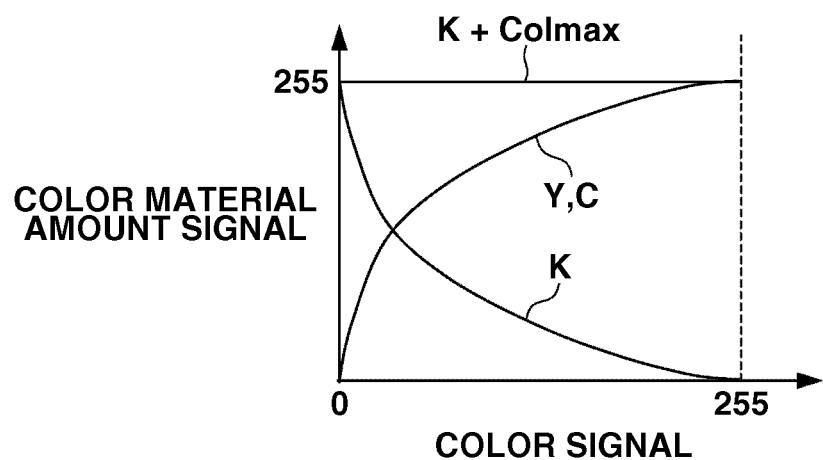

FIGS. 19A and 19B schematically illustrate color separation tables that can be applied to the black-color lines according to the present exemplary embodiment. In FIG. 19A, the ordinate axis represents the color material amount signal of the Kp-Yp line that constitutes the surface of the color gamut. The abscissa axis represents the R' or G' value of the color signal (R', G', B'), which indicates the color signal of the Kp-Yp line extending from (R', G', B')=(0, 0, 0) to (255, 255, 0).

In FIG. 19B, the ordinate axis represents the color material amount signal of the Kp-Gp line that constitutes the surface of the color gamut. The abscissa axis represents the G' value of the color signal (R', G', B'), which indicates the color signal of the Kp-Gp line extending from (R', G', B')=(0, 0, 0) to (0, 255, 0). Although not illustrated in FIGS. 19A and 19B, the color material amount signals C and M are 0 irrespective of the color signal in FIG. 19A. Further, the color material amount signal M is 0 irrespective of the color signal in FIG. 19B.

As illustrated in FIGS. 19A and 19B, the black-color line according to the present exemplary embodiment is set in such a way as to equalize a sum of the color material amount signal K of the black ink and a largest signal value Colmax of the color material amount signals C, M, and Y of the chromatic color inks (more specifically, the maximum value of input image data) to 255. Further, at least one of the color material amount signals C, M, and Y of the chromatic color inks is set to 0. The reason why the color material amount signal of the black-color line is set considering the above-described conditions is described below.

First, the reason why the sum of the color material amount signal K and the largest signal value Colmax of the color material amount signals C, M, and Y is set to be equal to 255 is described below.

The first reason is the necessity of forming the black dot and the chromatic color dot exclusively in such a way as to prevent the black dot and the chromatic color dot from being overlapped with each other. As described above, if the black dot and the chromatic color dot are formed exclusively, the lightness at a dark portion becomes darker or a high saturation color can be reproduced, compared to a case where the black dot and the chromatic color dot are overlapped with each other.

Accordingly, it is desired to arrange the black dot and the chromatic color dot exclusively to form an image that corresponds to the color signal (R', G', B') of the surface of the color gamut. However, if the sum of the color material amount signals K and Colmax exceeds 255, the black dot and the chromatic color dot are overlapped with each other.

For example, it is now assumed that an image includes 256 pixels in total (i.e., 16 pixels in each of the vertical and horizontal directions) and the color material amount signal (C, M, Y, K) of each pixel is (0, 0, 32, 255). An image formed in this case includes black dots formed for all pixels. In addition, to form yellow dots, the image includes 32 pixels at which the black dot and the yellow dot are overlapped with each other. More specifically, the image includes a portion where the black dot and the chromatic color dot are overlapped with each other. Therefore, it is unfeasible to increase the saturation at the dark portion.

The second reason is the necessity of eliminating a pixel where the paper white is exposed. If an image that reproduces the color of a dark portion includes a pixel where the paper white is exposed, the density (or saturation) decreases by an amount that corresponds to the paper white. Accordingly, it is desired that all pixels of an image that corresponds to the color signal (R', G', B') of the surface of the color gamut are formed by any one of ink dots. However, if the sum of the color material amount signals K and Colmax is less than 255, the generated image includes a pixel where the paper white is exposed.

Hereinafter, it is assumed that an image includes 256 pixels in total (i.e., 16 pixels in each of the vertical and horizontal directions) and the color material amount signal (C, M, Y, K) of each pixel is (0, 0, 120, 127). In this case, yellow dots are formed for 120 pixels and black dots are formed for 127 pixels. As a result, no ink dot is formed for the remaining nine pixels where the paper white is exposed. More specifically, it is unfeasible to increase the saturation at the dark portion because the paper white is exposed.

The third reason is the necessity of setting the number of the exclusive colors to be equal to or less than one color. As described above, if the number of the exclusive colors included in an image is set to be equal to or less than one color, it is feasible to reproduce a color having higher saturation, compared to an image including a plurality of exclusive colors. Accordingly, it is desired to set the number of the exclusive colors to be equal to or less than one color for an image that corresponds to the color signal (R', G', B') of the surface of the color gamut.

However, a plurality of exclusive colors may be generated if the sum of the color material amount signals K and Colmax is less than 255. Hereinafter, it is assumed that an image includes 256 pixels in total (i.e., 16 pixels in each of the vertical and horizontal directions) and the color material amount signal (C, M, Y, K) of each pixel is (64, 0, 96, 127). Further, the black dot and the chromatic color dot are not overlapped with each other, and there is not any pixel of the paper white.

In this case, 32 pixels are formed using only the cyan dots, and 64 pixels are formed using only the yellow dots. Further, 32 pixels are formed using the cyan dots and the yellow dots that are mutually overlapped, and 127 pixels are formed using only the black dots. More specifically, two colors of the cyan dots and the yellow dots are exclusive colors.

Referring back to FIG. 16, example processing that can be performed by the halftone processing unit 1606 is described in detail below. In the following description, the minimum constitutional unit serving as a target in image processing for processing multi-valued data that can be expressed using a plurality of bits is referred to as "pixel", and data corresponding to the pixel is referred to as "pixel data." Further, the pixel is the minimum unit that can be expressed using a gradational expression and has a gradation value equal to or greater than one bit.

The halftone processing unit 1606 converts 8-bit (0 to 255) data of the color signal values C, M, Y, and K determined by the color separation unit 1605 into 1-bit data (having a value of 0 or 1), more specifically, binary data, based on which the image forming apparatus 1501 can perform recording.

Figure 20:
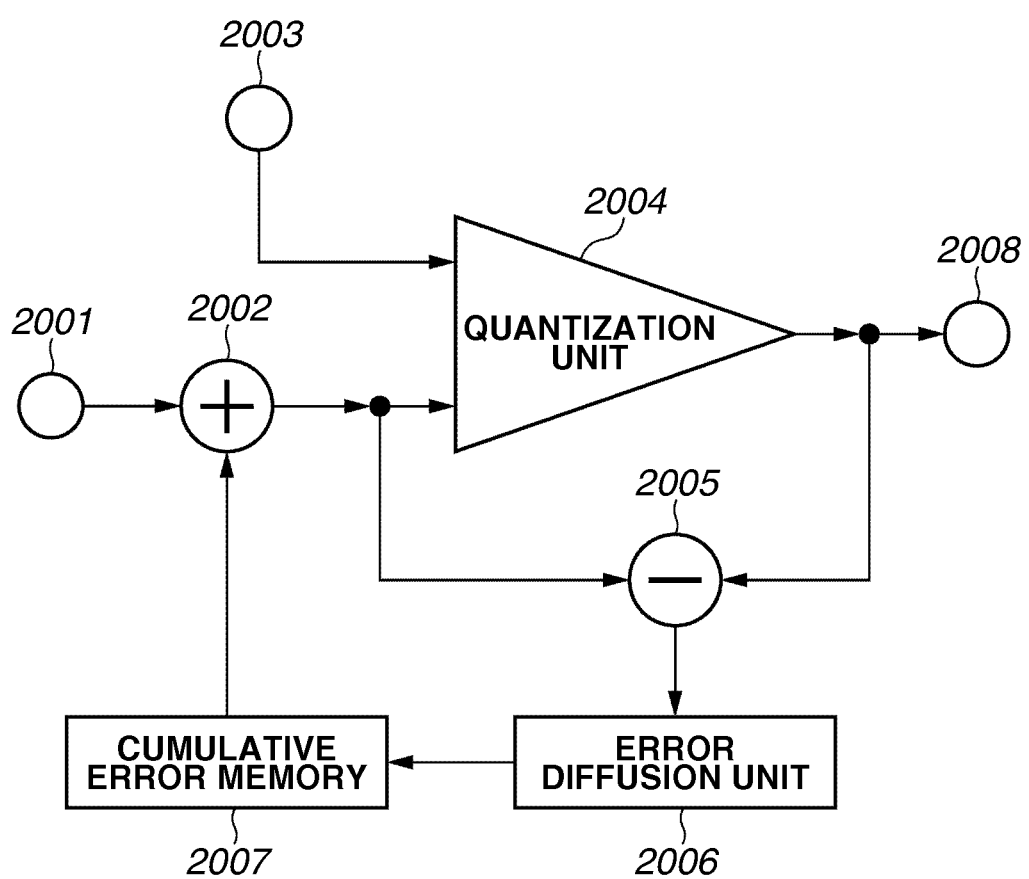
FIG. 20 is a block diagram schematically illustrating a halftone processing unit operable using an error diffusion method according to the first exemplary embodiment of the present invention.

FIG. 20 is a block diagram illustrating an example configuration of the halftone processing unit 1606. The halftone processing unit 1606 includes an input terminal 2001, via which pixel data can be received. A cumulative error addition unit 2002 can obtain a cumulative error. A threshold setting terminal 2003 can set a quantization threshold. A quantization unit 2004 can perform quantization processing. A quantization error calculation unit 2005 can calculate an error in the quantization processing. An error diffusion unit 2006 can diffuse the quantization error. A cumulative error memory 2007 can store the cumulative error. If pixel data is formed thorough the sequential processing, it can be output via an output terminal 2008. The quantization threshold (i.e., the threshold settable via the threshold setting terminal 2003) can be used to convert the input pixel data into one of a plurality of groups that correspond to the above-described gradation number (two gradations in the present exemplary embodiment).

Figure 21:
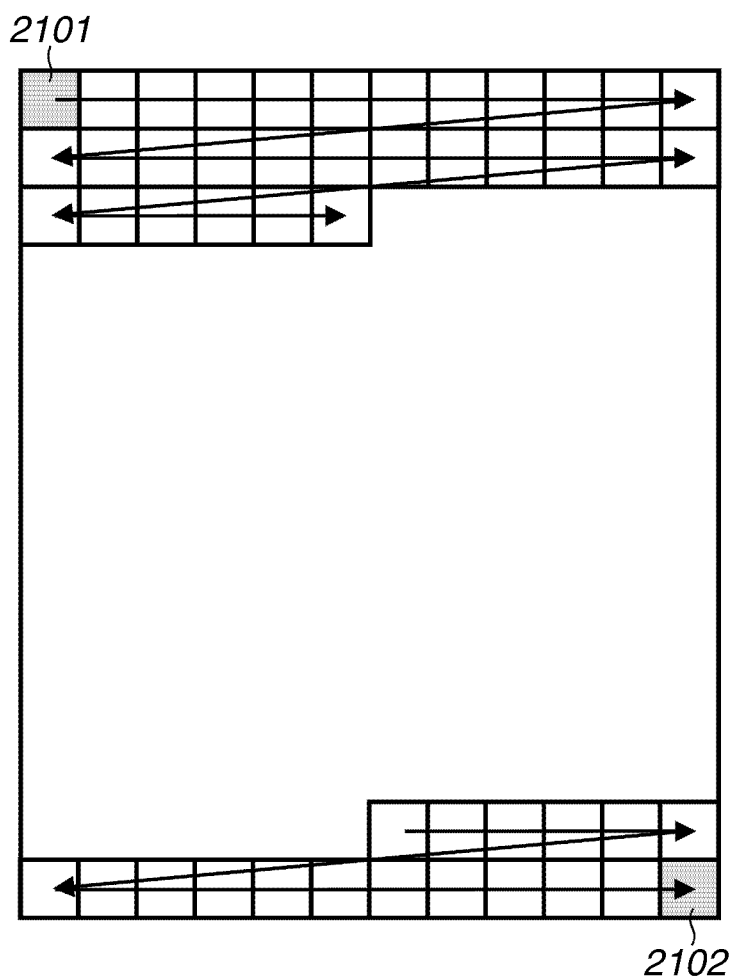
FIG. 21 illustrates an example of processing scan.

The halftone processing unit 1606 can process input pixel data sequentially and can output the processed data on a pixel-by-pixel basis via the output terminal 2008. FIG. 21 illustrates an example of processing scan. The input terminal 2001 selects a pixel to be subjected to the processing and inputs pixel data, on a pixel-by-pixel basis, when the image data includes a plurality of pixels arrayed in a predetermined order.

In FIG. 21, each square represents each pixel. A pixel 2101 is positioned at the upper-left edge of the image, and a pixel 2102 is positioned at the lower-right edge of the image. First, the halftone processing unit 1606 selects the pixel 2101 positioned at the upper-left edge of the image area as a target pixel and starts the processing on the selected pixel Subsequently, the halftone processing unit 1606 repeats the processing for each target pixel to be selected sequentially along an arrow direction (i.e., right direction).

If the halftone processing unit 1606 completes the processing for the pixel positioned at the right edge of the uppermost row, subsequently the halftone processing unit 1606 selects a pixel positioned at the left edge of the next row as the target pixel. Then, the halftone processing unit 1606 continues the processing scan in the above-described order (indicated by the arrow in FIG. 21) until the target pixel reaches the final position (i.e., the pixel 2102 positioned at the lower-right edge of the image. When the halftone processing unit 1606 completes the processing for all pixels, the halftone processing unit 1606 terminates the processing scan for the image.

Figure 22:
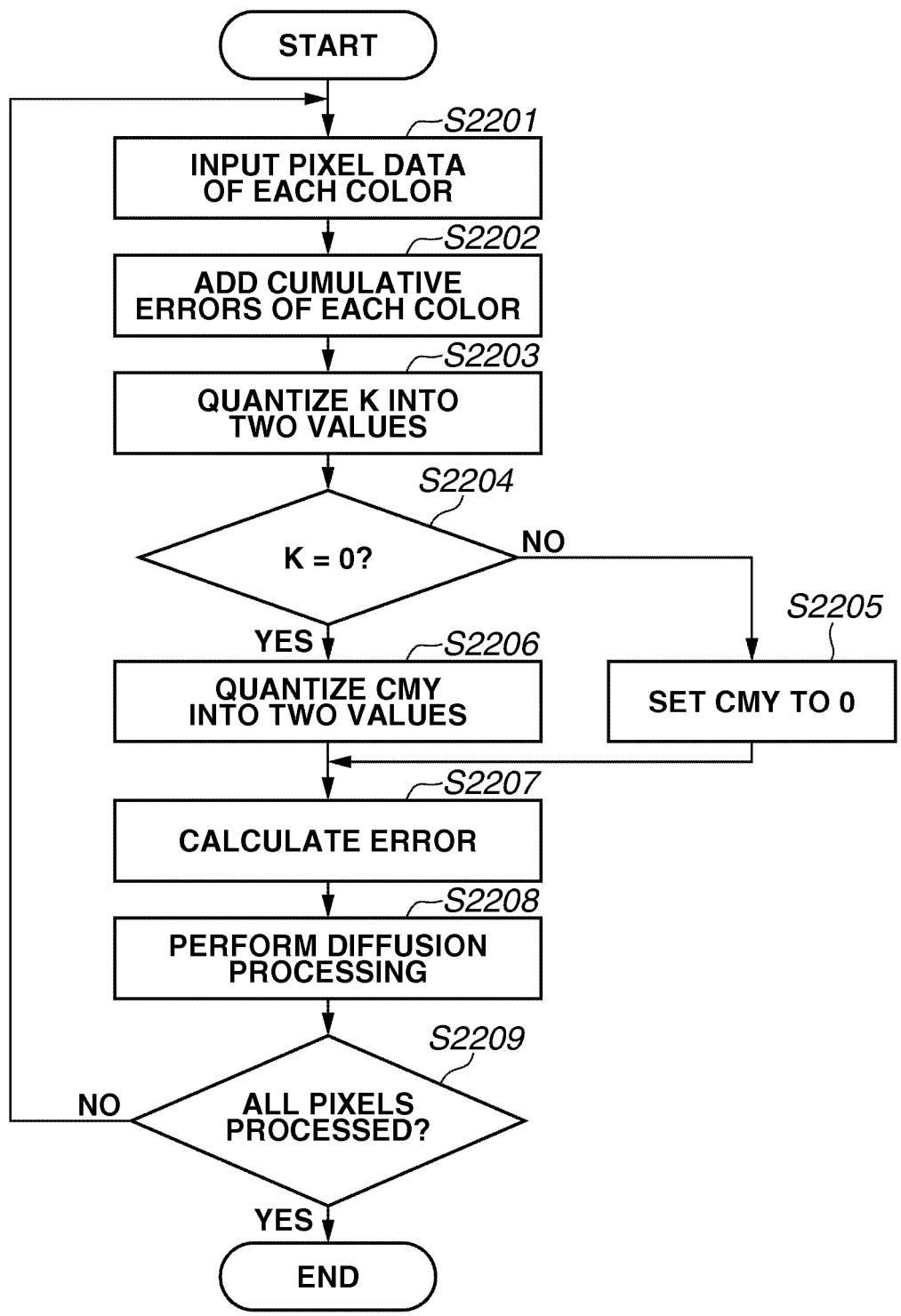
FIG. 22 is a flowchart illustrating an example operation that can be performed by the halftone processing unit according to the first exemplary embodiment of the present invention.

An example operation that can be performed by the halftone processing unit 1606 is described in detail below with reference to a flowchart illustrated in FIG. 22.

If the processing starts, then in step S2201, the halftone processing unit 1606 inputs 8-bit pixel data to be processed via the input terminal 2001 for each of the C, M, Y, and K colors.

Figure 23:
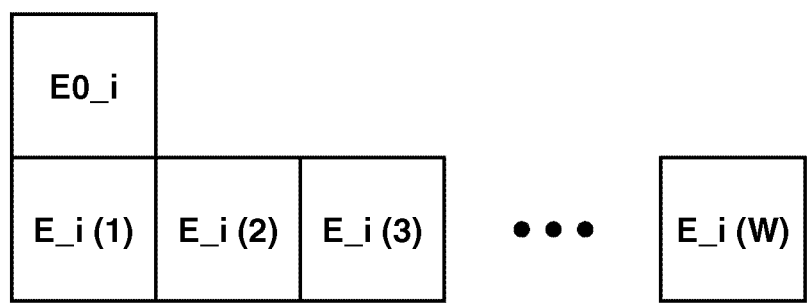
FIG. 23 illustrates example data stored in a cumulative error memory.

Next, in step S2202, the cumulative error addition unit 2002 adds a cumulative error that corresponds to the target pixel position, which is stored in the cumulative error memory 2007, to the input pixel data. The data stored in the cumulative error memory 2007 and the data storage form thereof are described in detail below with reference to FIG. 23. The cumulative error memory 2007 secures one storage area E0_i {i=C, M, Y, K} and W recording areas E_i(x)={x=1 to W (integer value) and i=C, M, Y, K} for each color. In this case, "W" represents the number of target pixels of the image data to be processed in the horizontal direction. Further, the cumulative error E_i(x) to be applied to the target pixel is stored in each area.

Although the cumulative error value can be obtained using a method described below, each area is initialized with an initial value 0 when the processing starts. The cumulative error addition unit 2002 adds a cumulative error E_i(x) value that corresponds to the horizontal position x (0<x≤W) of the target pixel to the input pixel data. More specifically, when I_i {i=C, M, Y, K} represents the pixel data input through the input terminal 2001 and (I_i)' {i=C, M, Y, K} represents the cumulative error added data to be obtained in step S2202, the following formula can be satisfied.

$$(I\_i)'=I\_i+E\_i(x) \qquad (11)$$

In the following step S2203, the quantization unit 2004 performs quantization processing by comparing the cumulative error added data (I_K)' with the threshold input via the threshold setting terminal 2003 for K, prior to the processing for chromatic color inks C, M, and Y. In the present exemplary embodiment, the quantization unit 2004 compares one threshold with the cumulative error added pixel data (I_K)' to obtain quantized pixel data that are classified into two groups and generates an output pixel data value to be supplied to the output terminal 2008. More specifically, a K output gradation value O_K that corresponds to the pixel data received from the cumulative error addition unit 2002 can be determined by the following formulae.

$$O\_K=0((I\_K)'<128) \qquad (12)$$

$$O\_K=1((I\_K)'\geq 128) \qquad (13)$$

Next, in step S2204, the quantization unit 2004 determines whether the K output gradation value O_K is 0 for the pixel having been subjected to the K quantization processing. If it is determined that the K output gradation value O_K is not 0 (NO in step S2204), then in step S2205, the quantization unit 2004 sets C, M, Y output gradation values O_i {i=C, M, Y} to 0 so that the black dot and the chromatic color dot can be formed exclusively in such a way as to prevent these dots from being overlapped with each other. If it is determined that the K output gradation value O_K is 0 (YES in step S2204), then in step S2206, the quantization unit 2004 binarizes C, M, and Y data.

Figure 24:
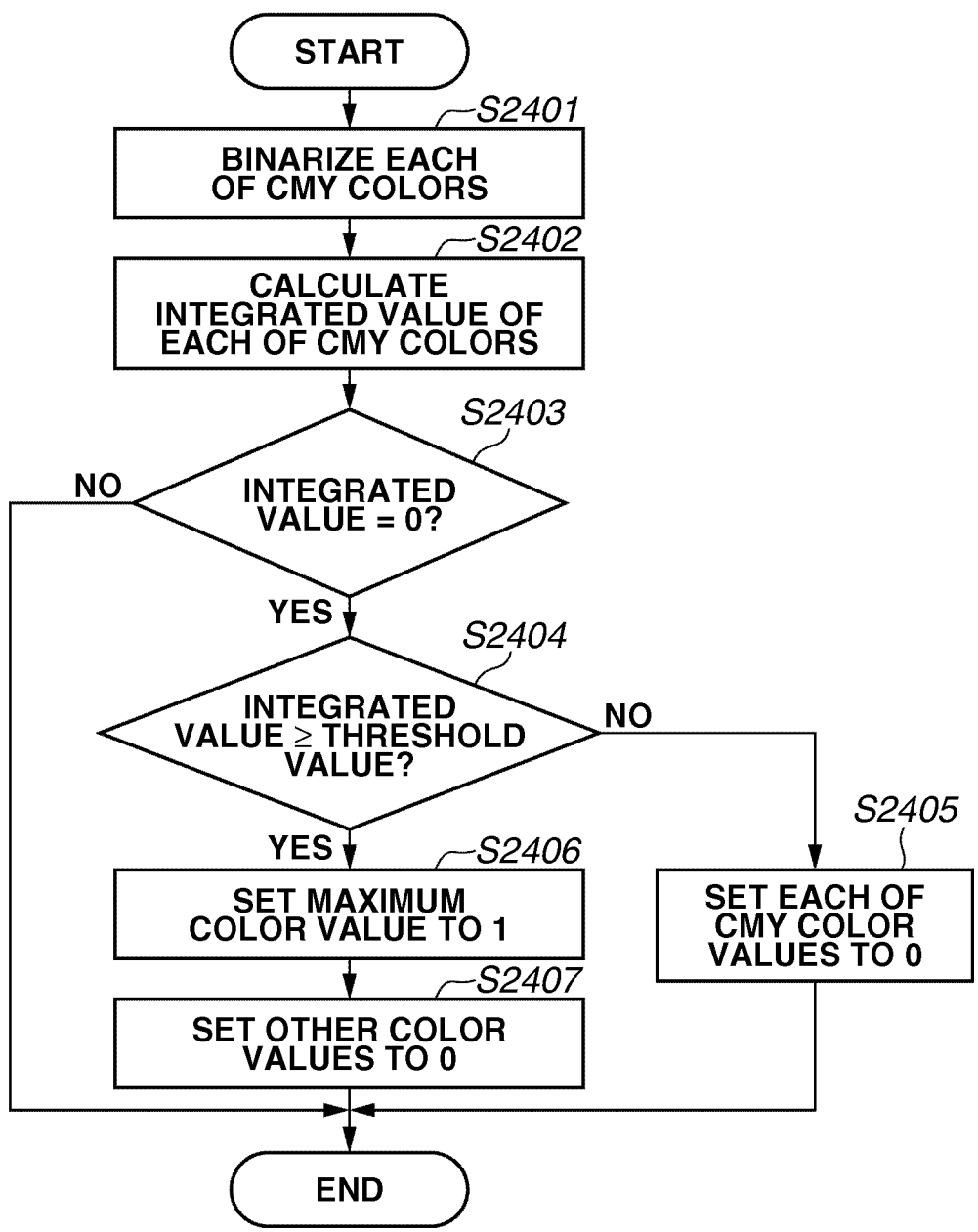
FIG. 24 is a flowchart illustrating example color ink quantization processing, which can be performed when a K output gradation value is 0, according to the first exemplary embodiment of the present invention.

The processing to be performed in step S2206 is described in detail below with reference to FIG. 24. FIG. 24 is a flowchart illustrating an example of the color ink quantization processing that can be performed by the quantization unit 2004 when the K output gradation value O_K is 0.

In step S2401, similar to the processing for the above-described K, the quantization unit 2004 performs quantization processing by comparing the cumulative error added data $(I\_i)'$ {i=C, M, Y} with the threshold input via the threshold setting terminal 2003. More specifically, C, M, Y provisional output gradation values $(O\_i)'$ {i=C, M, Y} that correspond to the pixel data received from the cumulative error addition unit 2002 can be determined by the following formulae.

$$(O\_C)'=0\ ((I\_C)'<128) \quad (14)$$

$$(O\_C)'=1\ ((I\_C)' \geq 128) \quad (15)$$

$$(O\_M)'=0\ ((I\_M)'<128) \quad (16)$$

$$(O\_M)'=1\ ((I\_M)' \geq 128) \quad (17)$$

$$(O\_Y)'=0\ ((I\_Y)'<128) \quad (18)$$

$$(O\_Y)'=1\ ((I\_Y)' \geq 128) \quad (19)$$

As described above in the processing of the color separation unit 1605, the density (or saturation) decreases if an image that reproduces the color of a dark portion includes a pixel where the paper white is exposed. Therefore, to conceal the paper white with the color ink that is largest in recording amount, the quantization unit 2004 performs the following processing in step S2402 and subsequent steps.

In step S2402, the quantization unit 2004 calculates an integrated value SUM_O_Col of the provisional output gradation values $(O\_i)'$ {i=C, M, Y} and an integrated value SUM_I_Col of the cumulative error added image data $(I\_i)'$ {i=C, M, Y} according to the following formulae.

$$SUM\_O\_Col=(O\_C)'+(O\_M)'+(O\_Y)' \quad (20)$$

$$SUM\_I\_Col=(I\_C)'+(I\_M)'+(I\_Y)' \quad (21)$$

In step S2403, the quantization unit 2004 determines whether the integrated value SUM_O_Col is 0. If it is determined that the integrated value SUM_O_Col is not 0 (NO in step S2403), more specifically when the provisional output gradation value $(O\_i)'$ of at least one color ink is 1 (i.e., dot is ON), the quantization unit 2004 terminates the color ink quantization processing after executing the following formulae.

$$O\_C=(O\_C)' \quad (22)$$

$$O\_M=(O\_M)' \quad (23)$$

$$O\_Y=(O\_Y)' \quad (24)$$

If it is determined that the integrated value SUM_O_Col is 0 (YES in step S2403), more specifically, when the provisional output gradation values of all color inks are 0 (i.e., dot is OFF), then in step S2404, the quantization unit 2004 performs the following conditional determination. The quantization unit 2004 compares the integrated value SUM_I_Col of the cumulative error added image data $(I\_i)'$ {i=C, M, Y} with a threshold having been set beforehand. In the present exemplary embodiment, the threshold value is 128, although it is easy to prevent the paper white from being exposed if the threshold value is smaller than 128.

If the SUM_I_Col is equal to or less than the threshold (NO in step S2404), then in step S2405, the quantization unit 2004 executes processing according to the following formulae.

$$O\_C=0\ (SUM\_I\_Col<128) \quad (25)$$

$$O\_M=0\ (SUM\_I\_Col<128) \quad (26)$$

$$O\_Y=0\ (SUM\_I\_Col<128) \quad (27)$$

If it is determined that the SUM_I_Col is greater than the threshold (YES in step S2404), then in step S2406, the quantization unit 2004 sets the output gradation value of the color ink that has the maximum value with respect to the cumulative error added image data $(I\_i)'$ {i=C, M, Y} to 1. Then, in step S2407, the quantization unit 2004 sets the output gradation value of other color inks to 0 to prevent the paper white from being exposed.

Through the above-described procedure, the quantization unit 2004 completes the quantization processing for each of the C, M, Y, and K color data.

Referring back to FIG. 22, the halftone processing unit 1606 performs error calculation and error diffusion processing in the following manner.

In step S2207, the quantization error calculation unit 2005 calculates a quantization error E_i based on the cumulative error added pixel data $(I\_i)'$ and the output pixel value O_i according to the following formula.

$$E\_i=(I\_i)'-O\_i \times 255 \quad (28)$$

Further, in step S2208, the error diffusion unit 2006 performs error diffusion processing, with reference to the position x of the target pixel in the horizontal direction, in the following manner. More specifically, the error diffusion unit 2006 calculates quantization errors to be stored in the storage areas E0_i and E_i(x) according to the following processing and stores the calculated quantization errors in the cumulative error memory 2007. In each of the following formulae, an arrow represents substitution calculation.

$$E\_i(x+1) \leftarrow E\_i(x+1)+E\_i \times 7/16\ (x<W) \quad (29)$$

$$E\_i(x-1) \leftarrow E\_i(x-1)+E\_i \times 3/16\ (x>1) \quad (30)$$

$$E\_i(x) \leftarrow E0\_i+E\_i \times 5/16\ (1<x<W) \quad (31)$$

$$E\_i(x) \leftarrow E0\_i+E\_i \times 8/16\ (x=1) \quad (32)$$

$$E\_i(x) \leftarrow E0\_i+E\_i \times 13/16\ (x=W) \quad (33)$$

$$E0\_i \leftarrow E\_i \times 1/16\ (x<W) \quad (34)$$

$$E0\_i \leftarrow 0\ (x=W) \quad (35)$$

Through the above-described procedure, the error diffusion unit 2006 completes the error diffusion processing for one pixel having been input through the input terminal 2001.

In step S2209, the halftone processing unit 1606 determines whether the above-described processing in step S2201 to step S2208 has been thoroughly completed for all pixels of the image. More specifically, the halftone processing unit 1606 determines whether the target pixel (i.e., the input pixel) has reached the final position (i.e., the pixel 2102 illustrated in FIG. 21). If it is determined that the target pixel has not yet reached the final position (NO in step S2209), the halftone processing unit 1606 shifts the target pixel to the next one in the arrow direction.

Then, the processing returns to step S2201. If it is determined that the processing has been completed for all pixels (YES in step S2209), the halftone processing unit 1606 completes the halftone processing illustrated in FIG. 22. As a result, the 256-valued color material amount signals (C, M, Y, K) output from the color separation unit 1605 can be converted into binary signals (C', M', Y', K') each representing ON/OFF of the dot.

An image that can be obtained when the halftone processing according to the present exemplary embodiment is performed on image data whose color separated color material amount signals (C, M, Y, K) are all (127,0,64,128) is described in detail below with reference to FIG. 25. To simplify the following description, FIG. 25 illustrates a predetermined area of 8×4 pixels extracted from the above-described image. In FIG. 25, K indicates an area where only the black dot is ON. Similarly, C indicates an area where only the cyan dot is ON. C/Y indicates an area where both the cyan and yellow dots are ON. It is understood that the black dots and chromatic color dots are arranged exclusively. As illustrated in FIG. 25, it is understood that any one of ink dots is ON in each area and the paper white is not exposed. Further, it is understood that there is not any pixel where only the yellow dot is ON and two chromatic colors are not formed exclusively.

Figure 43:
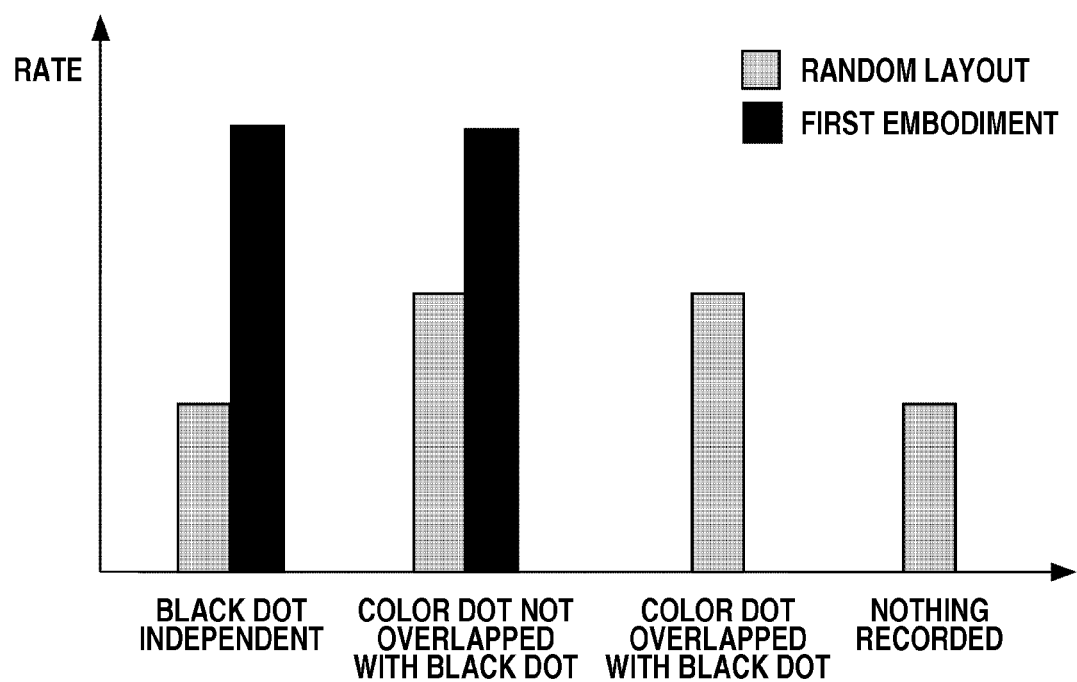
FIG. 43 is a graph illustrating a comparison with respect to a dot overlapped state between an example subjected to the first exemplary embodiment and a random layout example.

FIG. 43 is a graph illustrating a comparison with respect to the dot overlapped state between the example illustrated in FIG. 25 (i.e., the example subjected to the above-described processing according to the present exemplary embodiment) and a random layout example. FIG. 43 illustrates the rate of pixels in which black dots are formed exclusively, the rate of pixels in which black dots and color dots are not overlapped with each other, the rate of pixels in which black dots and color dots are mutually overlapped, and the rate of pixels in which noting is recorded, in each processing.

Respective rates according to the random layout example can be calculated using the generally known Neugebauer equations. From the comparison illustrated in FIG. 43, it is understood that the effect of employing the present exemplary embodiment is that the rate of pixels in which black dots and color dots are mutually overlapped can be reduced to 0.

The method employed to perform the binarization processing in the above-described exemplary embodiment is the error diffusion method. However, for example, it is also useful to employ the dither method to perform the binarization processing. The halftone processing method is not limited to a particular method and can be any other appropriate method capable of realizing the binarization in such a way as to arrange the chromatic color dots of OFF in the pixel where the black dots are ON.

The halftone processing unit 1606 transmits the processed 1-bit data of respective C, M, Y, and K colors to the image forming apparatus 1501. At this moment, the presence of dots in each area of a recording medium is already determined. Therefore, it is feasible to form a desired image on the recording medium by directly inputting the dot information to a driving circuit of the recording head. More specifically, the image forming apparatus 1501 can complete image formation corresponding to the width of the recording head during a single main scanning operation.

However, the recording method usually employed in an inkjet recording apparatus is multi-pass recording. Therefore, the multi-pass recording method is simply described below. The inkjet recording method is generally classified into two types. The first type is a line type that can form an image on a recording medium with a recording head having a width comparable to a print area while moving the recording medium in the sub scanning direction. The second type is a serial type that can form an image sequentially on a recording medium with a recording head having a width shorter than that of the line type while alternately repeating the main scanning and the sub scanning for recording.

The main scanning for recording is the scanning to be performed with a carriage mounting the recording head moving relative to a recording medium. The sub scanning is the scanning to be performed to convey the recording medium by a predetermined amount in a direction perpendicular to the main scanning for recording.

In this case, the width of a recording area during a single main scanning can be determined by the arrangement density and the number of a plurality of ink discharge ports formed on the recording head. If a single record scanning is employed to perform recording, the ink recording position may fluctuate due to a manufacturing error of a nozzle that discharges an ink or air stream caused by the recording head during the main scanning. The light and shade streaks caused in this case, which are generally referred to as "banding", deteriorate the image quality. Therefore, in many cases, the multi-pass recording method is employed to improve the image quality.

According to the multi-pass method, each of different blocks performs a plurality of main scanning operations to complete the recording of an image. Therefore, a single main scanning does not process all of the recordable image data. A so-called "mask" is used to classify the image data into respective blocks (to allocate the image data to respective blocks). In many cases, no image signal is taken into consideration when the mask is determined. For example, when an AND circuit for the mask and the image signal supplied to each recording element is provided, it is feasible to form a configuration capable of determining whether to record an image signal given in each record scanning.

Figure 26:
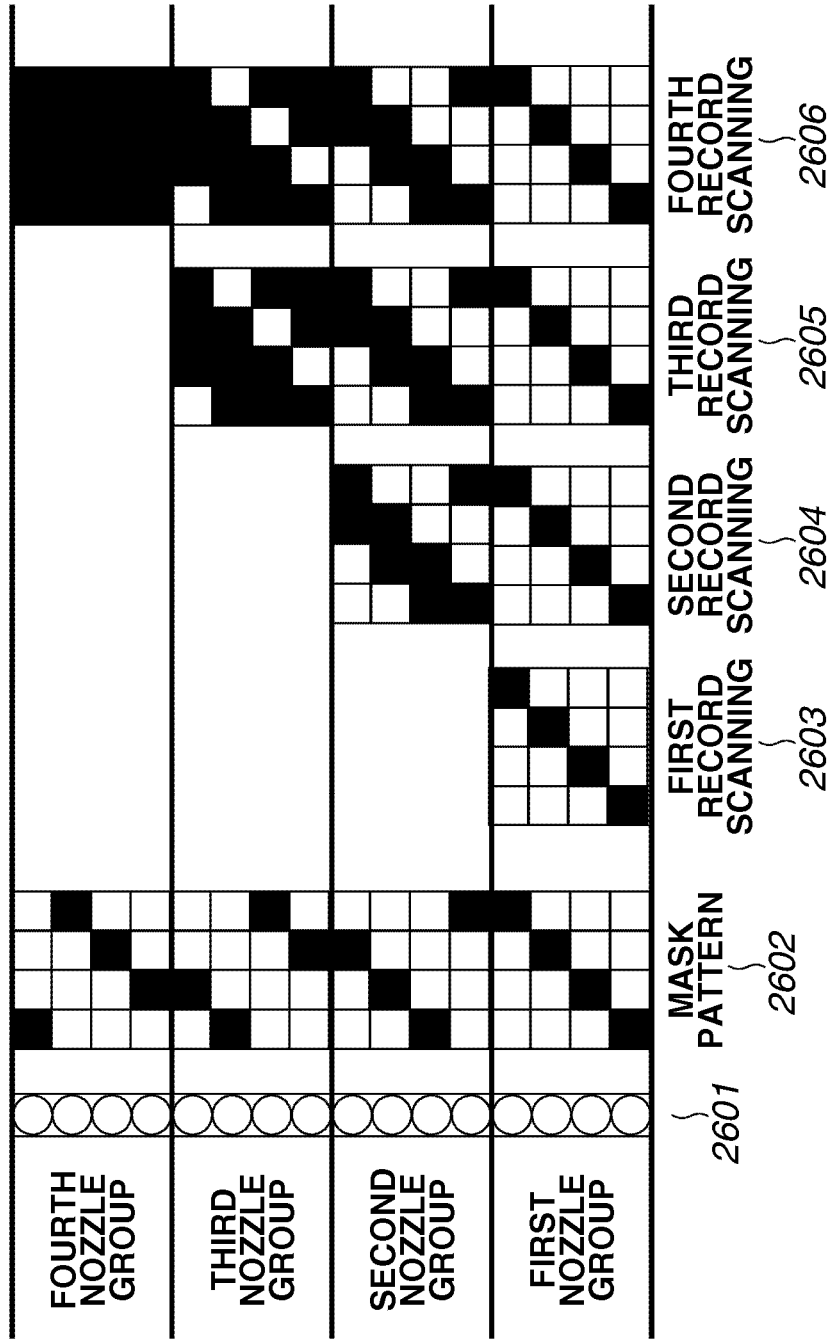
FIG. 26 schematically illustrates a recording head and recording patterns that can be obtained by a multi-pass recording method.

FIG. 26 schematically illustrates an example relationship between a recording head 2601 and recording patterns that can be realized by the multi-pass recording method. The recording head 2601 includes numerous (approximately 768) nozzles. However, to simplify the following description, FIG. 26 illustrates only sixteen nozzles of the recording head 2601. As is understood from the illustration of FIG. 26, the nozzles of the recording head 2601 are divided into four (i.e., the first to the fourth) nozzle groups. Each nozzle group includes four nozzles.

A mask pattern 2602 includes at least one black square area where the corresponding nozzle performs recording. The recording patterns of respective nozzle groups are in a mutually complementary relationship. It is understood that the recording of a 4×4 area can be accomplished by overlapping these recording patterns.

A plurality of patterns (i.e., pattern 2603 to pattern 2606) indicates the sequential formation of an image that can be completed by repeating the record scanning operations. When each record scanning terminates, a recording medium is conveyed in a direction indicated by an arrow by an amount corresponding to the width of the nozzle group. Therefore, the printing of an image in the same area (i.e., the area corresponding to the width of each nozzle group) of the recording medium can be accomplished through a total of four record scanning operations. As described above, forming the same area of a recording medium through a plurality of scanning operations performed by a plurality of nozzle groups has effects of reducing the dispersion inherent to respective nozzles and the dispersion relating to the conveyance accuracy of a recording medium.

To simplify the description, the above-mentioned example has been described based on the 4×4 area. However, for example, if the recording head has 768 nozzles, it is usual that the mask pattern (mask data) has "768 areas divided by the recording pass number" in the vertical direction and 256 areas in the horizontal direction.

In the present exemplary embodiment, the image forming apparatus has a built-in memory that stores the mask data. The pass separation unit 1609 obtains an AND value between the mask data and the output signal of the above-described halftone processing to determine pixels to be actually formed (discharged) in each record scanning.

The discharge signal generation unit 1610 transmits discharge data C'i, M'i, Y'i, and K'i (i is scanning number) generated by the pass separation unit 1609 for each scanning to the driving circuit of the recording head 1513 at appropriate timing. Thus, the recording head 1513 is driven to discharge inks based on the discharge data.

The processing to be performed by the pass separation unit 1609 of the image forming apparatus 1501 can be realized by a dedicated hardware circuit under the control of the CPU 1510, which serves as a control unit of the image forming apparatus.

The method for controlling the dot layout data of the black color material (i.e., black color material data) and the dot layout data of respective chromatic color materials (i.e., chromatic color material data) at the surface of the color gamut of a dark portion has been described. As described above, if the position of a color is the surface of a dark portion in the color gamut that can be formed using the black color material and the plurality of chromatic color materials, it is feasible to enlarge the color gamut of the dark portion when the black color material data and the chromatic color material data are arranged exclusively. The effects of enlarging the color gamut can be obtained when the black color material data and the chromatic color material data are exclusive at least in a color gamut where a black color material amount data value is greater than any chromatic color material amount data value.

The method for setting the color separation table by the color separation unit 1605 is not limited to the above-described method. For example, if a color separation table dedicated to a recording medium sets an upper-limit value with respect to the total color material amount, it is feasible to prevent the ink from overflowing by setting the color material amount data in such a way as to satisfy the upper-limit value.

Further, it is feasible to reduce the consumption amount of inks by setting the color material amount data to be equal to or less than the above-described upper-limit value. In this case, there may be a pixel where the paper white (an area where no dot is formed) is exposed, or the number of exclusive colors may become two or more. However, in such a case, it is feasible to expand the color gamut within the setting range of the color separation table when the black dots and the chromatic color dots are arranged exclusively.

Further, the method described in the present exemplary embodiment includes checking a quantization result of the black dot (i.e., determining whether to form the black dot) and then determining whether to form the chromatic color dot based on the determination result. However, the process of determining the necessity of forming the chromatic color dots can be performed at early timing.

In this case, the first step of the method is quantizing the integrated value of the chromatic color material data and the second step is determining the number of chromatic color dots to be formed. For example, it is assumed that the quantization thresholds having been set are 128, 384, and 640. If the integrated value is equal to or greater than 0 and less than 128, the image forming apparatus 1501 records nothing. If the integrated value is equal to or greater than 128 and less than 384, the image forming apparatus 1501 records only one color that has a largest value with respect to the color material data. If the integrated value is equal to or greater than 384 and less than 640, the image forming apparatus 1501 records two colors that are first and second largest in color material data. If the integrated value is greater than 640, the image forming apparatus 1501 records three colors that are first, second, and third largest in color material data.

For example, if the target pixel has 8-bit color material amount data (C, M, Y, K)=(224, 0, 196, 31), the integrated value of the chromatic color dots is equal to 420. Therefore, the image forming apparatus 1501 records two colors that are first and second largest in color material data. More specifically, the image forming apparatus 1501 forms the cyan and yellow dots. In a case where any one of the chromatic color dots is formed, the image forming apparatus 1501 does not form any black dot. Further, in a case where no chromatic color dot is formed, the image forming apparatus 1501 determines the presence of a black dot to be formed based on a threshold having been set beforehand and, if the value is greater than the threshold, the image forming apparatus 1501 forms the black dot.

Further, it may be useful to set the maximum value of the total color material amount to be equal to or greater than 100% (255 in 8-bit data). In this case, a dot layout in which the same ink colors (e.g., K and K or Y and Y) are overlapped in the up-and-down direction is employable.

The image forming system having the capability of enlarging the color gamut of a dark portion, which has been described in the first exemplary embodiment, is characterized in that the black dots and the chromatic color dots are spatially exclusive at the surface of the color gamut, there is not any pixel where the paper white is exposed, and the number of exclusive colors is set to be equal to or less than one color.

Figure 27:
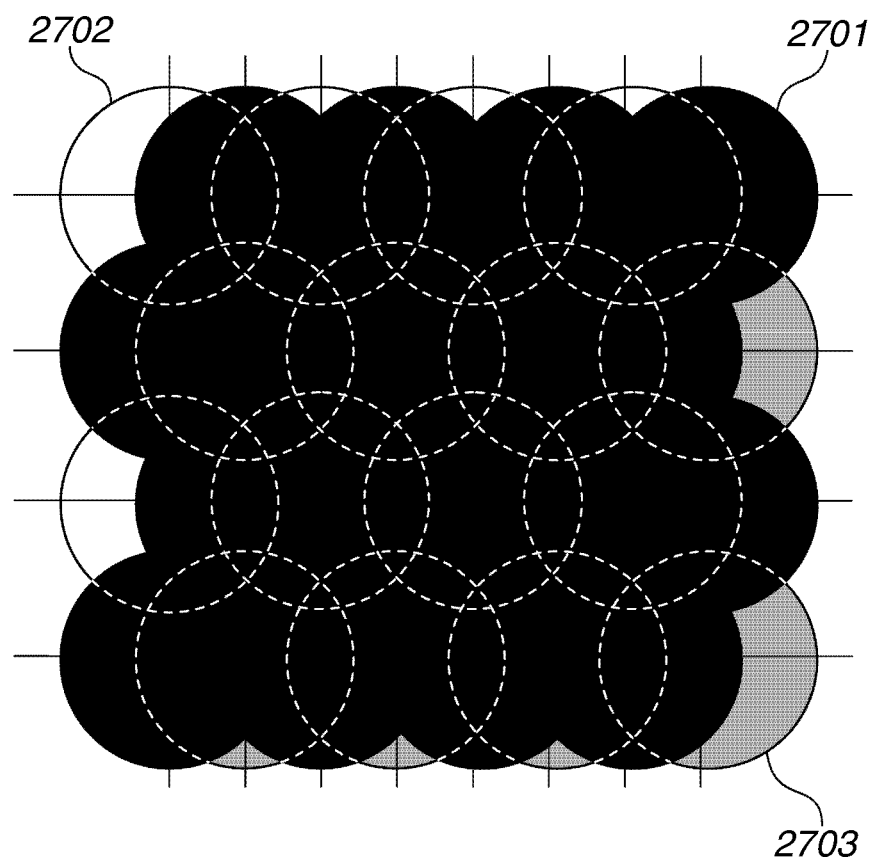
FIG. 27 schematically illustrates an example dot layout on a recording medium that can be obtained through the processing according to the first exemplary embodiment of the present invention.

However, a dot has a circular shape when it is formed on a recording medium (i.e., a paper surface). A black dot and a chromatic color dot to be arranged exclusively may be overlapped undesirably. FIG. 27 illustrates an example dot layout on the paper surface when the dot diameter is 30 μm in a case where an image has been subjected to the halftone processing illustrated in FIG. 25. In FIG. 27, a circular black dot 2701 is the K dot. A circular white dot 2702 is the C dot. It is understood that the K dot and the C dot are formed exclusively. Further, a circular gray dot 2703 is the C/Y dot where the C dot and the Y dot are overlapped with each other. As is understood from FIG. 27, the black dot and the chromatic color dot may be partly overlapped when the diameter of each dot is large.

In view of the foregoing, an image forming system according to a second exemplary embodiment has the capability of forming dots in a clustered (concentrated) manner, as described below. The image forming system according to the second exemplary embodiment is similar to the system described in the first exemplary embodiment, except for the configuration relating to image processing. Therefore, the descriptions of the similar components or portions are not repeated.

Figure 28:
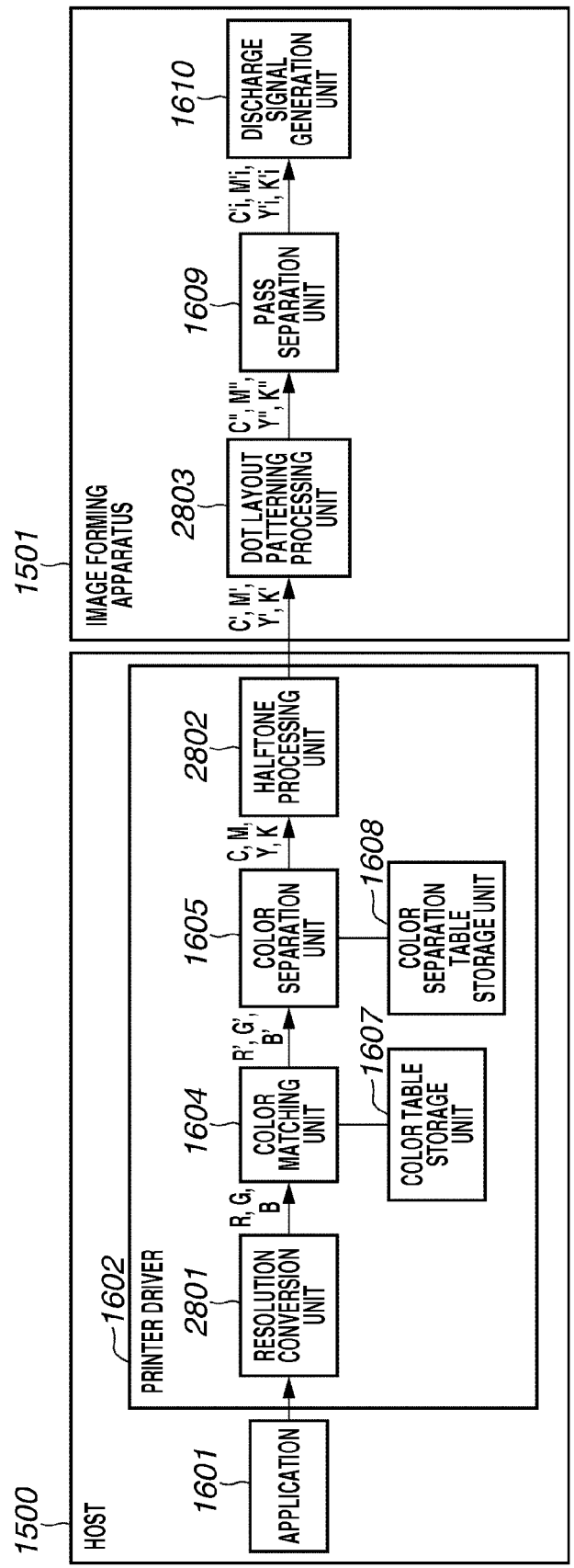
FIG. 28 is a block diagram illustrating a schematic image processing configuration according to a second exemplary embodiment of the present invention.

An example image processing configuration of the image forming system according to the present exemplary embodiment is described in detail below with reference to a block diagram illustrated in FIG. 28. A host 1500 includes a printer driver 1602 that is operable to convert input image data, when it is received from an application program 1601, into 9-valued (0 to 8) data. The conversion from the input image data to the 9-valued data can be realized by a resolution conversion unit 2801, a color matching unit 1604, a color separation unit 1605, and a halftone processing unit 2802.

An image forming apparatus 1501 according to the present exemplary embodiment includes a dot layout patterning processing unit 2803 and a pass separation unit 1609 that can convert 9-valued data received from the halftone processing unit 2802 into binary data indicating formation/non-formation of respective dots. The binary data is then transmitted, as discharge data of each recording pass of each color ink, to the recording head 1513 via a discharge signal generation unit 1610. The recording head 1513 records an image on the recording medium 1408 with ink materials based on the discharge data.

The image forming system according to the present exemplary embodiment is similar to the system described in the first exemplary embodiment except for the resolution conversion unit 2801, the halftone processing unit 2802, and the dot layout patterning processing unit 2803. Therefore, the descriptions are not repeated for the similar constituent components.

The resolution conversion unit 2801 can convert the input image data (e.g., 8-bit RGB data of 720 dpi) into image data having the resolution of 600 dpi. More specifically, the input image data is expressed as an assembly of pixels each having the width of $1/720$ inch. Each pixel takes a value of 0 to 255. The input image data is composed of three types of, i.e., red (R), green (G), and blue (B), color signals. The resolution conversion unit 2801 converts the above-described input image data into image data of 600 dpi in the main scanning direction and 600 dpi in the sub scanning direction using a conventionally known resolution conversion method, such as bi-cubic convolution.

The halftone processing unit 2802 can convert 8-bit (0 to 255) data of the color signal values C, M, Y, and K determined by the color separation unit 1605 into 9-valued (0 to 8) data.

The halftone processing unit according to the present exemplary embodiment has a system configuration and performs pixel processing scan that are similar to those described in the first exemplary embodiment. Therefore, the descriptions of the similar components and portions are not repeated, although FIGS. 20, 21, and 23 can be appropriately referred to.

Figure 29:
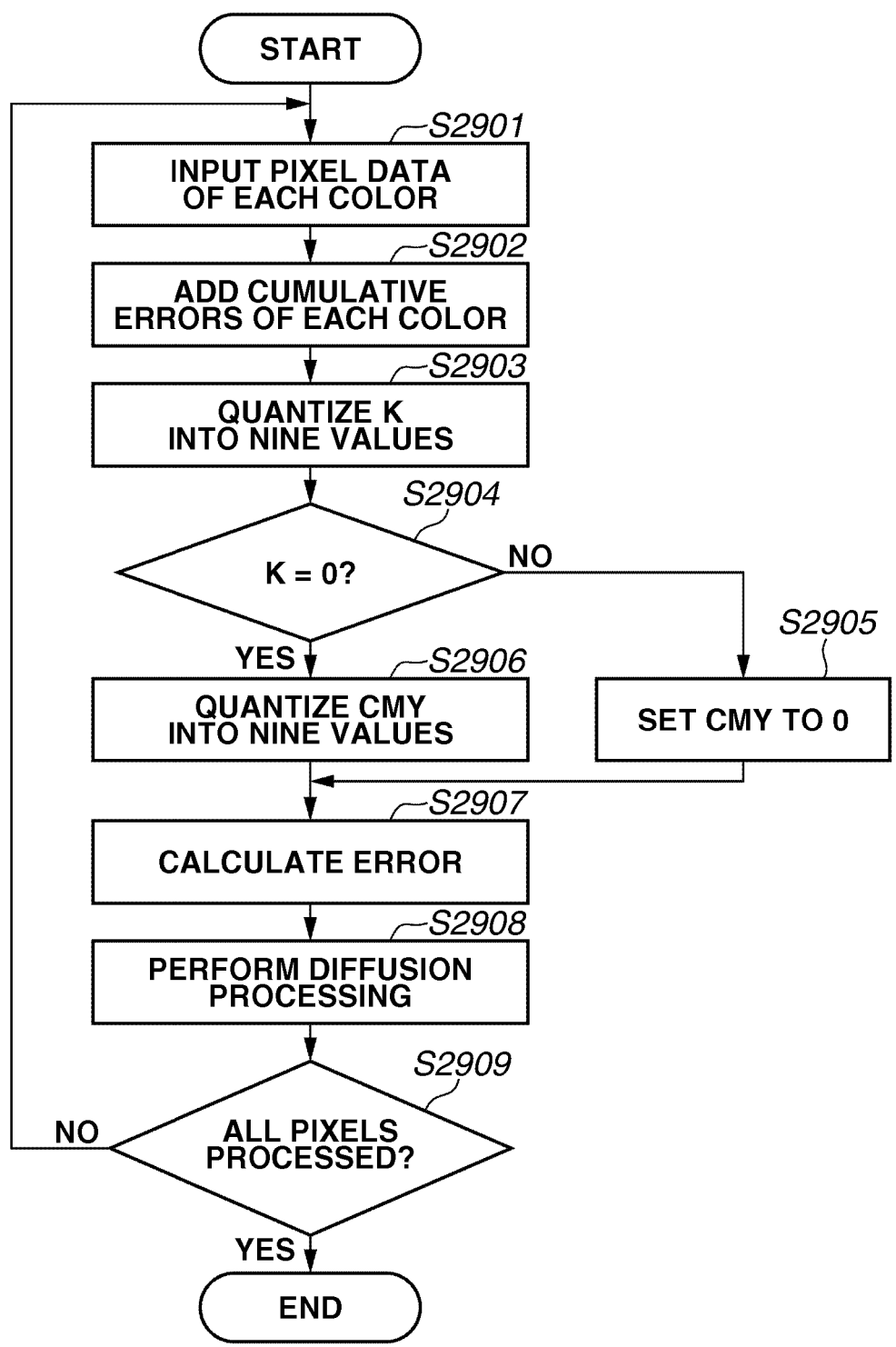
FIG. 29 is a flowchart illustrating an example operation that can be performed by a halftone processing unit according to the second exemplary embodiment of the present invention.

FIG. 29 is a flowchart illustrating an example operation that can be performed by the halftone processing unit 2802 according to present exemplary embodiment.

If the processing starts, then in step S2901, the halftone processing unit 2802 inputs 8-bit pixel data to be processed for each of the C, M, Y, and K colors.

Next, in step S2902, the cumulative error addition unit 2002 adds a cumulative error that corresponds to the target pixel position, which is stored in the cumulative error memory 2007, to the input pixel data. More specifically, the cumulative error addition unit 2002 adds a cumulative error $E\_i(x)$ value that corresponds to the horizontal position x ($0 < x \leq W$) of the target pixel to the input pixel data. More specifically, when $I\_i \{i=C, M, Y, K\}$ represents the pixel data input through the input terminal 2001 and $(I\_i)' \{i=C, M, Y, K\}$ represents the cumulative error added data to be obtained in step 1602, the following formula can be satisfied.

$$(I\_i)' = I\_i + E\_i(x) \tag{36}$$

In the following step S2903, the quantization unit 2004 performs quantization processing by comparing the cumulative error added data $(I\_K)'$ with the threshold input via the threshold setting terminal 2003 for K, prior to the processing for chromatic color inks C, M, and Y. In the present exemplary embodiment, the quantization unit 2004 compares one threshold with the cumulative error added pixel data $(I\_K)'$ to obtain quantized pixel data that are classified into two groups and determines an output pixel data value to be supplied to the output terminal 2008.

More specifically, a K output gradation value O_K that corresponds to the pixel data received from the cumulative error addition unit 2002 can be determined by the following formulae.

$$O\_K = 0 \; (I\_K)' < 128) \tag{37}$$

$$O\_K = 255 \; (I\_K)' \geq 128) \tag{38}$$

For convenience in the following description, the K output gradation value O_K is referred to as level 0 if O_K=0, and as level 8 if O_K=225. Through the above-described K quantization processing, the K signal is quantized into two levels and K dots are formed in a clustered (concentrated) manner.

Next, in step S2904, the quantization unit 2004 determines whether the K output gradation value O_K is 0 for the pixel having been subjected to the K quantization processing. If it is determined that the K output gradation value O_K is not 0 (NO in step S2904), then in step S2905, the quantization unit 2004 sets C, M, Y output gradation values $O\_i \{i=C, M, Y\}$ to 0 so that the black dot and the chromatic color dot can be formed exclusively in such a way as to prevent these dots from being overlapped with each other. If it is determined that the K output gradation value O_K is 0 (YES in step S2904), then in step S2906, the quantization unit 2004 quantizes C, M, and Y data into nine groups.

More specifically, the quantization unit 2004 compares the cumulative error added data $(I\_i)' \{i=C, M, Y\}$ with the threshold input via the threshold setting terminal 2003. Thus, C, M, Y output gradation values $O\_i \{i=C, M, Y\}$ that correspond to the pixel data received from the cumulative error addition unit 2002 can be determined by the following formulae.

$$O\_i = 0 \; ((I\_i)' < 16) \tag{39}$$

$$O\_i = 32 \; (16 \leq (I\_i)' < 48) \tag{40}$$

$$O\_i = 64 \; (48 \leq (I\_i)' < 80) \tag{41}$$

$$O\_i = 96 \; (80 \leq (I\_i)' < 112) \tag{42}$$

$$O\_i = 128 \; (112 \leq (I\_i)' < 144) \tag{43}$$

$$O\_i = 160 \; (144 \leq (I\_i)' < 176) \tag{44}$$

$$O\_i = 192 \; (176 \leq (I\_i)' < 208) \tag{45}$$

$$O\_i = 224 \; (208 \leq (I\_i)' < 240) \tag{46}$$

$$O\_i = 255 \; ((I\_i)' \geq 240) \tag{47}$$

For convenience in the following description, the output gradation value O_i is referred to as level 0 if O_i=0, as level 1 if O_i=32, and as level 8 if O_i=225. Through the above-described K quantization processing, the K signal is quantized into two levels and K dots are formed in a clustered (concentrated) manner.

Through the above-described procedure, the quantization unit 2004 completes the quantization processing for all of the C, M, Y, and K colors.

Next, in step S2907, the quantization error calculation unit 2005 calculates a quantization error $E\_i \{i=C, M, Y, K\}$ based on the cumulative error added pixel data (I_i)' {i=C, M, Y, K} and the output pixel value O_i {i=C, M, Y, K} according to the following formula.

$$E\_i = (I\_i)' - O\_i \quad (48)$$

Further, in step S2908, the error diffusion unit 2006 performs error diffusion processing, with reference to the position x of the target pixel in the horizontal direction, in the following manner. More specifically, the error diffusion unit 2006 calculates quantization errors to be stored in the storage areas E0_i and E_i(x) according to the following processing and stores the calculated quantization errors in the cumulative error memory. In each of the following formulae, an arrow represents substitution calculation.

$$E\_i(x+1) \leftarrow E\_i(x+1) + E\_i \times 7/16 \, (x<W) \quad (49)$$

$$E\_i(x-1) \leftarrow E\_i(x-1) + E\_i \times 3/16 \, (x>1) \quad (50)$$

$$E\_i(x) \leftarrow E0\_i + E\_i \times 5/16 \, (1<x<W) \quad (51)$$

$$E\_i(x) \leftarrow E0\_i + E\_i \times 8/16 \, (x=1) \quad (52)$$

$$E\_i(x) \leftarrow E0\_i + E\_i \times 13/16 \, (x=W) \quad (53)$$

$$E0\_i \leftarrow E\_i \times 1/16 \, (x<W) \quad (54)$$

$$E0\_i \leftarrow 0 \, (x=W) \quad (55)$$

Through the above-described procedure, the error diffusion unit 2006 completes the error diffusion processing for one pixel having been input through the input terminal 2001.

In step S2909, the halftone processing unit 2802 determines whether the above-described processing in step S2901 to step S2908 has been thoroughly completed for all pixels of the image. More specifically, the halftone processing unit 2802 determines whether the target pixel (i.e., input pixel) has reached the final position (i.e., the pixel 2102 illustrated in FIG. 21). If it is determined that the target pixel has not yet reached the final position (NO in step S2909), the halftone processing unit 2802 shifts the target pixel to the next one in the arrow direction.

Then, the processing returns to step S2901. If it is determined that the processing has been completed for all pixels (YES in step S2909), the halftone processing unit 2802 completes the halftone processing illustrated in FIG. 29. As a result, the 256-valued color material amount signals (C, M, Y, K) output from the color separation unit 1605 can be converted into 9-valued signals (C', M', Y', K').

The method employed to perform 9-valued quantization processing in the present exemplary embodiment is the error diffusion method. However, for example, it is also useful to employ the multi-valued dither method to perform the 9-valued quantization processing. The quantization method is not limited to a particular method and can be any other 9-valued quantization method capable of setting the chromatic color dot to level 0 in the pixel where the black dot is level 8.

An image that can be obtained when the halftone processing according to the present exemplary embodiment is performed on image data constituted by 2×2 pixels whose color separated color material amount signals (C, M, Y, K) are all (127, 0, 64, 255) is described in detail below with reference to FIG. 30. It is understood that K dots and chromatic color dots are arranged exclusively when the halftone processing is performed according to the present exemplary embodiment.

The dot layout patterning processing unit 2803 performs dot layout processing, for each pixel corresponding to actually printed image, in such a way as to realize a dot layout pattern that corresponds to 4-bit index data (i.e., gradation value information), i.e., print image data. In the above-described halftone processing, the level number decreases from 256-valued multi-value density information (8-bit data) to 9-valued gradation value information (4-bit data). However, the information that can be actually recorded by the image forming apparatus 1501 according to the present exemplary embodiment is binary information indicating whether to form an ink dot.

The dot layout patterning processing unit 2803 converts the multi-value level (0 to 8) into the binary level that determines the presence of the dot. More specifically, the dot layout patterning processing unit 2803 receives each pixel expressed using 4-bit data from the halftone processing unit 2802 and allocates a dot layout pattern that corresponds to the gradation value (level 0 to 8) of the received pixel. Thus, it becomes feasible to define ON/OFF of a dot to be located at each of a plurality of areas in one pixel and arrange 1-bit ("1" or "0") discharge data to each area in the pixel.

Figures 31A, 31B, 31C, 31D:
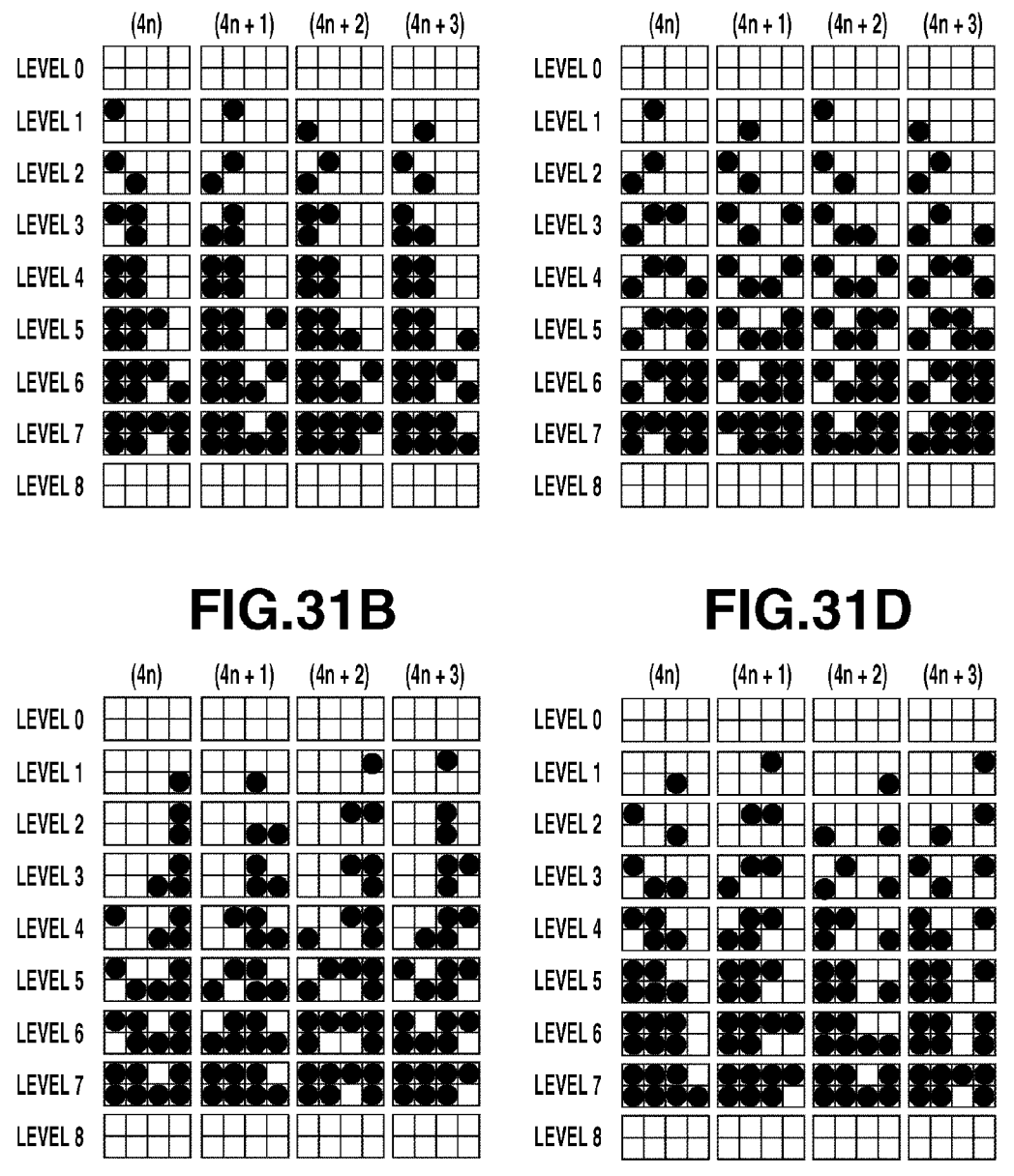

FIG. 31A illustrates output patterns that correspond to respective input levels 0 to 8, which can be obtained through conversion of the dot layout patterning processing unit 2803. In FIG. 31A, the level values located on the left side are the output values (level 0 to level 8) of the halftone processing unit 2802. Matrices (each including 2 areas in the vertical direction×4 areas in the horizontal direction) located on the right side of each level value correspond to 1-pixel areas output through the halftone processing.

Further, each of the plurality of areas that constitute one pixel is a minimum unit defining ON/OFF of each dot. In FIG. 31A, a circular black mark indicates a dot forming area. The number of dots to be formed in each matrix increases one by one when the level number is incremented.

In the present exemplary embodiment, the density information of an original image can be finally reflected in the above-described manner. When an integer equal to or greater than 1 is input "n", (4n) to (4n+3) indicate the pixel positions of an input image from the left edge in the horizontal direction. Respective patterns located beneath the pixel positions (4n) to (4n+3) indicate that a plurality of patterns differentiated according to the pixel position are prepared at each input level.

More specifically, even when the input level of continuous pixels is the same, four types of dot layout patterns indicated by (4n) to (4n+3) are allocated cyclically on a recording medium. In FIG. 31A, the vertical direction is the port array direction along which the discharge ports of the recording head are arrayed, and the horizontal direction is the scanning direction of the recording head. All of dot arrangement patterns can be determined on the recording medium by thoroughly completing the above-described dot layout patterning processing.

Accordingly, employing the above-described configuration capable of forming various dot layouts for the same level can bring effects of decentralization in the number of discharges between nozzles positioned at an upper position and nozzles positioned at a lower position of a dot layout pattern as well as decentralization with respect to various noises that are peculiar to the image forming apparatus.

FIG. 31A illustrates a cyan dot layout pattern. FIG. 31B illustrates a magenta dot layout pattern. FIG. 31C illustrates a yellow dot layout pattern. FIG. 31D illustrates a black dot layout pattern. When the dot layout pattern is differentiated for each color as described above, it becomes feasible to determine the dot layout in such away as to prevent the paper surface from being exposed at the upper-right and lower-left pixels (i.e., the area where the colored dots are formed) illustrated in FIG. 30. More specifically, the dot layout patterning processing unit 2803 converts the halftone processed 9-valued data into binary data indicating "formation"/"non-formation" of respective dots.

Further, the dot layout patterning processing unit 2803 converts the recording resolution of the image forming apparatus 1501, although the resolution is fixed to 600 dpi in the vertical direction and 600 dpi in the horizontal direction when the image data is processed in the printer driver 1602 (the resolution conversion unit 2801 to the halftone processing unit 2802).

Figure 30:
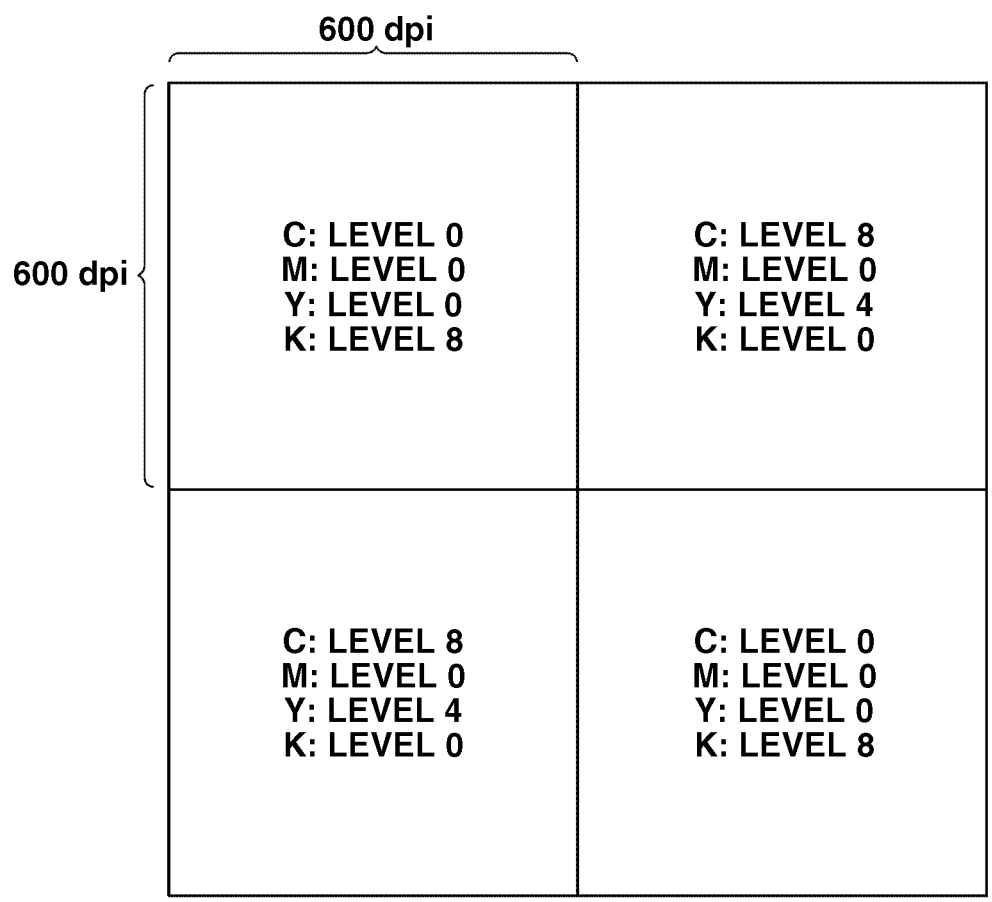
FIG. 30 schematically illustrates an image having been subjected to halftone processing according to the second exemplary embodiment of the present invention.

FIG. 32 schematically illustrates an example image obtainable when the dot layout patterning processing is performed on the halftone processed data illustrated in FIG. 30. In FIG. 32, K indicates an area where only the black dot is ON. Similarly, C indicates an area where only the cyan dot is ON. C/Y indicates an area where both the cyan and yellow dots are ON. It is understood that the black dots and chromatic color dots are arranged exclusively. Further, according to the above-described example of the color material amount signal, the sum of the color material amount signals K and Colmax is set to be 255 in such a way as to prevent the paper white from being exposed.

As illustrated in FIG. 32, it is understood that any one of ink dots is ON in each area and the paper white is not exposed. Further, it is understood that there is not any pixel where only the yellow dot is ON and two chromatic colors are not formed exclusively. Further, it is understood that a total of eight K dots are arranged adjacent in a clustered (concentrated) manner that can be realized by the image forming system according to the second exemplary embodiment.

Figure 33:
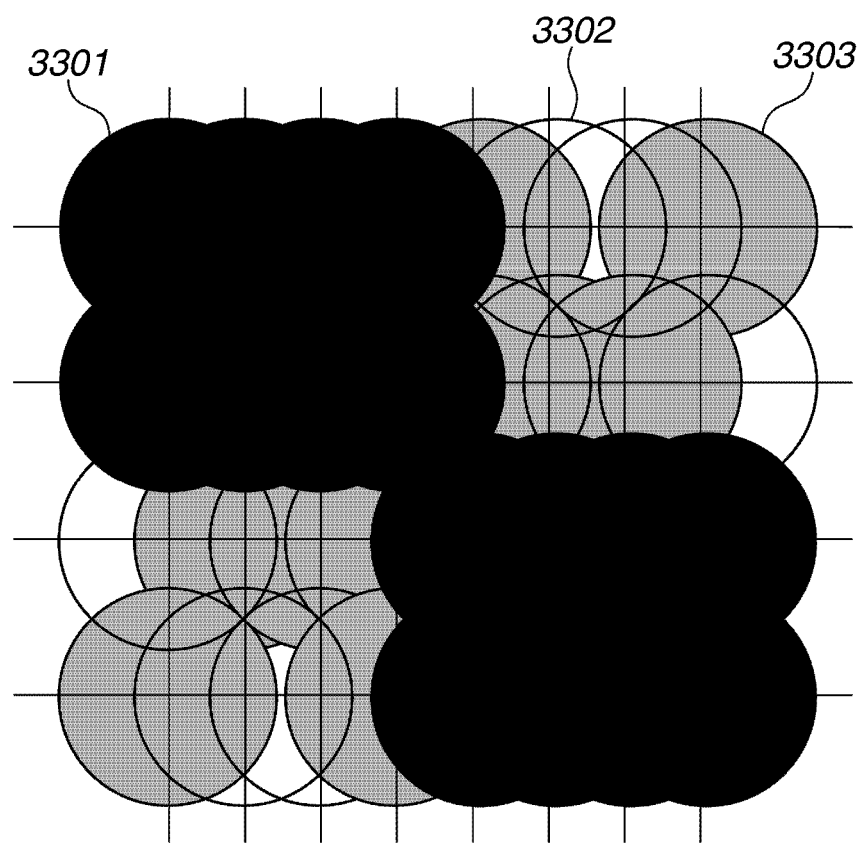
FIG. 33 schematically illustrates an example dot layout on a recording medium that can be obtained through the processing according to the second exemplary embodiment of the present invention.

FIG. 33 illustrates an example dot layout on the paper surface when the dot diameter is 30 μm, with respect to the image illustrated in FIG. 32. In FIG. 33, a circular black dot 3301 is the K dot and a circular white dot 3302 in the C dot. Further, a circular gray dot 3303 is the C/Y dot where the C dot and the Y dot are overlapped with each other. As is understood from FIG. 33, the region where the K dot and the chromatic color dot are overlapped is smaller than that in the dot layout illustrated in FIG. 27.

Figure 34:
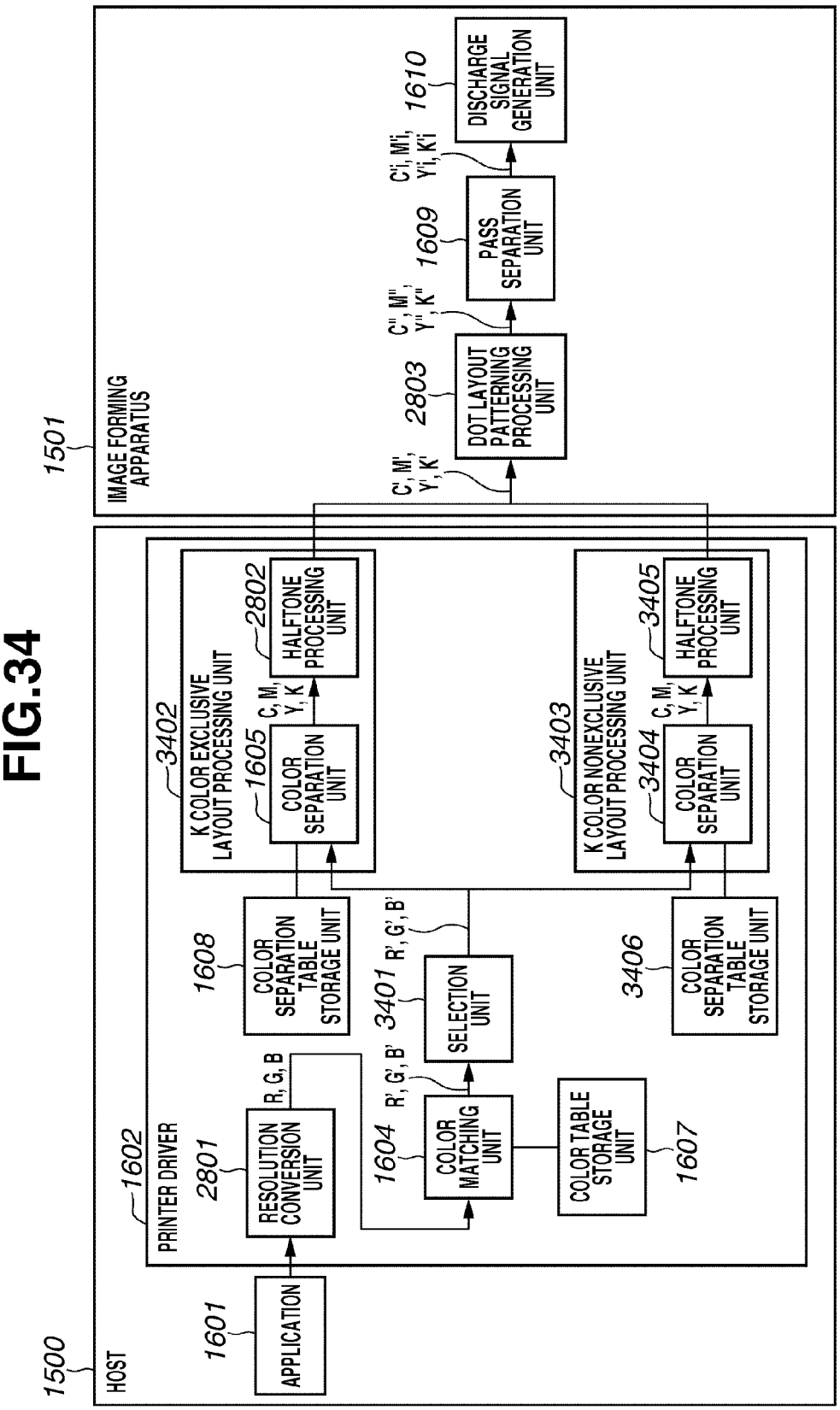
FIG. 34 is a block diagram schematically illustrating an image processing configuration according to a third exemplary embodiment of the present invention.

An image processing configuration of an image forming system according to a third exemplary embodiment is described below. FIG. 34 is a block diagram illustrating an example of the image processing configuration of the image forming system according to the third exemplary embodiment.

A host 1500 includes a printer driver 1602 that is operable to convert input image data, if it is received from an application program 1601, into halftone data and output the halftone data to an image forming apparatus 1501. The conversion from the input image data to the halftone data can be realized by a resolution conversion unit 2801, a color matching unit 1604, a selection unit 3401, a K color exclusive layout processing unit 3402, and a K color nonexclusive layout processing unit 3403.

The image forming apparatus 1501 includes a dot layout patterning processing unit 2803 and a pass separation unit 1609 that can convert halftone data, if it is received from the printer driver 1602, into ink discharge signals, based on which the recording head 1513 can record an image on the recording medium 1408.

The selection unit 3401 can determine (select) whether to arrange K dots and color dots exclusively or nonexclusively based on the input color signals. If the selection unit 3401 selects the exclusive layout, the K color exclusive layout processing unit 3402 performs the following processing. If the selection unit 3401 selects the nonexclusive layout, the K color nonexclusive layout processing unit 3403 performs the following processing.

The K color exclusive layout processing unit 3402 includes a color separation unit 1605 and a halftone processing unit 2802 that respectively perform the processing described in the second exemplary embodiment and output halftone data that can realize an exclusive layout of K dots and color dots, which is wide in color gamut and excellent in color reproduction in the dark portion. On the other hand, the K color nonexclusive layout processing unit 3403 includes a color separation unit 3404 and a halftone processing unit 3405 that output halftone data that can realize a nonexclusive layout of K dots and color dots, which is excellent in graininess.

The image forming system according to the present exemplary embodiment is similar to the above-described system described in the second exemplary embodiment, except for the selection unit 3401, the K color nonexclusive layout processing unit 3403 (i.e., the color separation unit 3404 and the halftone processing unit 3405). Therefore, the descriptions are not repeated for the similar constituent components.

Figure 35:
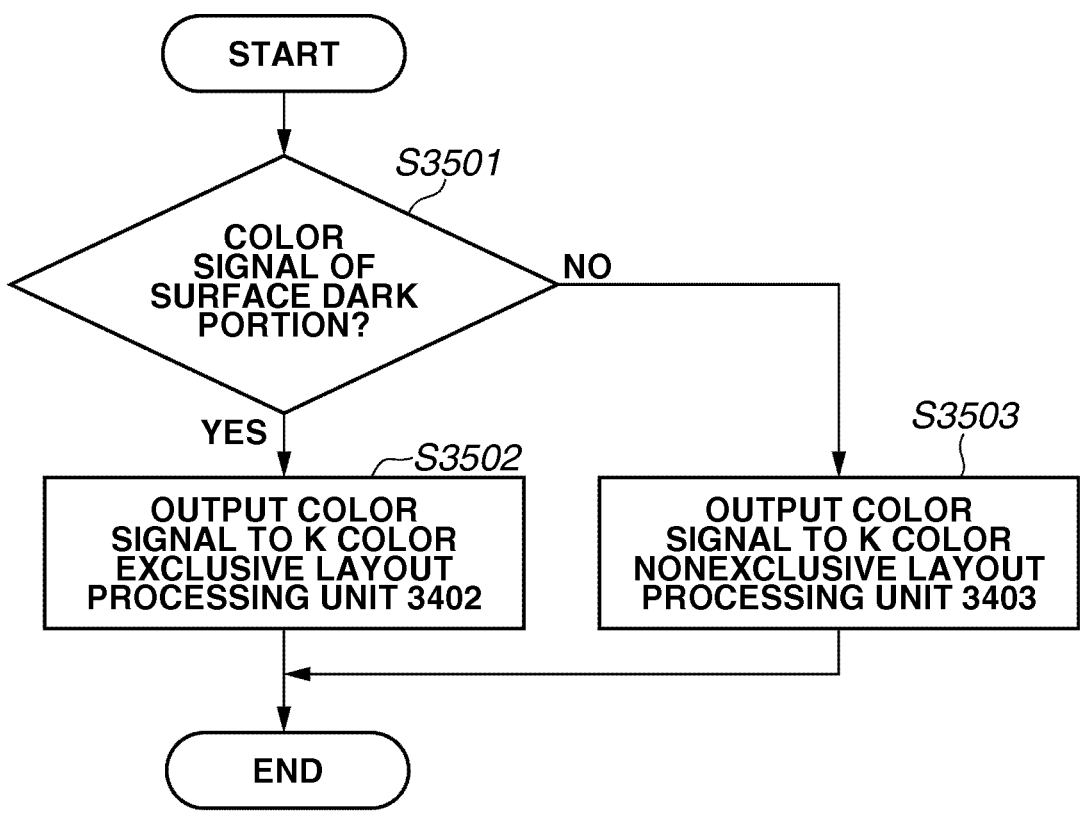
FIG. 35 is a flowchart illustrating a processing procedure of a selection unit according to the third exemplary embodiment of the present invention.

Processing to be performed by the selection unit 3401 is described in detail below with reference to a flowchart illustrated in FIG. 35. The selection unit 3401 determines (selects) whether to arrange K dots and color dots exclusively or nonexclusively according to the following procedure.

First, in step S3501, the selection unit 3401 determines whether the input color signal R'G'B'in is a color signal of the outer shell dark portion. The outer shell dark portion is, for example, the surface of a dark portion color gamut occupied by six tetrahedrons Kp-A-Mp'-Rp', Kp-A-Rp'-Yp', Kp-A-Yp'-Gp', Kp-A-Gp'-Cp', Kp-A-Cp'-Bp', and Kp-A-Bp'-Mp'illustrated in FIG. 18. Further, point A, point Mp', point Rp', point Yp', point Gp', point Cp', and point Bp' can be defined by (R', G', B')=(64, 64, 64), (64, 0, 64), (64, 0, 0), (64, 64, 0), (0, 64, 0), (0, 64, 64), and (0, 0, 64). The tetrahedrons are not limited to the above-described examples. For example, a dark portion can be designated using the color gamut occupied by tetrahedrons Kp-Wp-Mp-Rp, Kp-Wp-Rp-Yp, Kp-Wp-Yp-Gp, Kp-Wp-Gp-Cp, Kp-Wp-Cp-Bp, and Kp-Wp-Bp-Mp, as described in the first exemplary embodiment.

Further, the above-described selection by the selection unit 3401 can be performed based on the input image data, for example, by checking whether the black color material amount data value is greater than any one of chromatic color material amount data values. Then, if it is determined that the black color material amount data value is greater than any one of the chromatic color material amount data values in a concerned color gamut, the black color material data and the chromatic color material data are arranged exclusively in this color gamut and not arranged exclusively in other color gamut. Alternatively, any color gamut in which the black color material amount data value is not 0 can be designated as the outer shell dark portion.

If it is determined that the input color signal R'G'B' in is the color signal of the outer shell dark portion (YES in step S3501), the processing proceeds to step S3502. On the other hand, if it is determined that the input color signal R'G'B' in is not the color signal of the outer shell dark portion (NO in step S3501), the processing proceeds to step S3503.

In step S3502, the selection unit 3401 selects the exclusive layout of K dots and color dots and outputs the input color signal to the K color exclusive layout processing unit 3402.

In step S3503, the selection unit 3401 selects the nonexclusive layout of K dots and color dots and outputs the input color signal to the K color nonexclusive layout processing unit 3403.

Next, the K color nonexclusive layout processing unit 3403 is described below. The color separation unit 3404 is similar to the color separation unit 1605 described in the first exemplary embodiment in configuration, although the color separation table to be referred to is a color separation table stored in the color separation table storage unit 3406. The color separation table stored in the color separation table storage unit 3406 is not required to satisfy the conditions to be required to enlarge the above-described dark portion color gamut. Therefore, the color separation table stored in the color separation table storage unit 3406 can be a general color separation table.

More specifically, on the black-color line, it is not always required that the sum of the color material amount signal K of the black ink and the largest signal value Colmax of the color material amount signals C, M, and Y of the chromatic color inks is 255. Further, when the general color separation table is used, all the color material amount signals C, M, and Y of the chromatic color inks can take a value other than 0 on the black-color line illustrated in FIG. 19.

Further, when the input color signal is a specific one, an image excellent in graininess can be obtained using C, M, and Y dots, instead of using K dots. Accordingly, the value of the color material amount signal K on the black-color line is set to be smaller than the value of the color separation table stored in the color separation table storage unit 1608. Further, the values of the color material amount signals C, M, and Y on the black-color line are set to be greater than the value of the color separation table stored in the color separation table storage unit 1608.

The halftone processing unit 3405 performs general error diffusion processing. The halftone processing unit 3405 converts 8-bit (0 to 255) data of the color signal values C, M, Y, and K determined by the color separation unit 3404 into 9-valued (0 to 8) data. The halftone processing unit according to the present exemplary embodiment has a system configuration and performs pixel processing scan that are similar to those described in the first exemplary embodiment. Therefore, the descriptions of the similar components and portions are not repeated, although FIGS. 20, 21, and 23 can be appropriately referred to.

Figure 36:
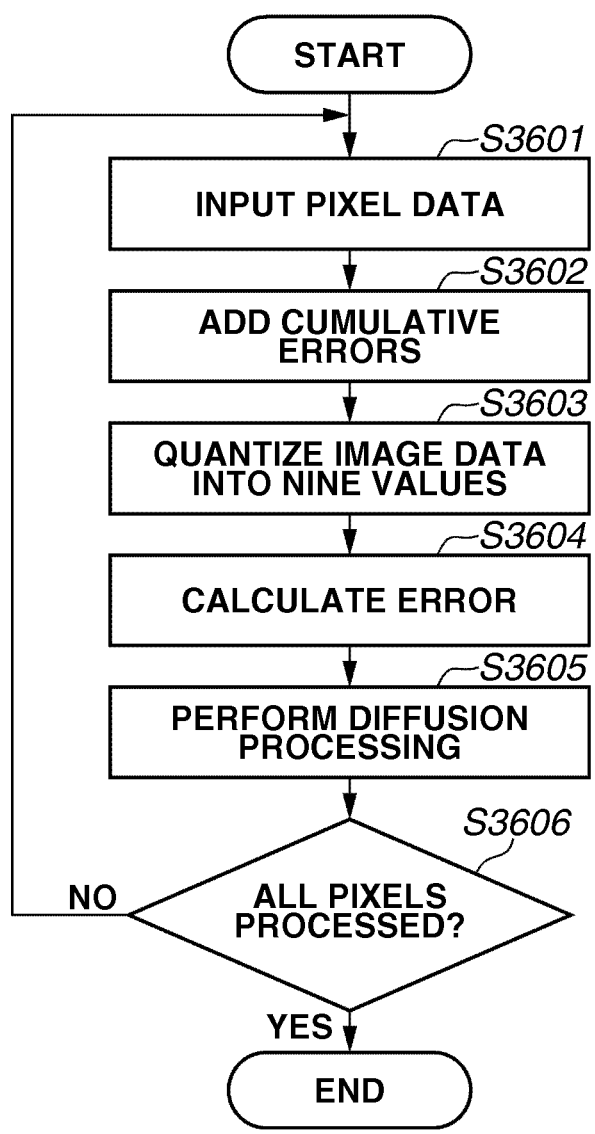
FIG. 36 is a flowchart illustrating an example operation that can be performed by a halftone processing unit according to the third exemplary embodiment of the present invention.

FIG. 36 is a flowchart illustrating an example operation that can be performed by the halftone processing unit 3405.

If the processing starts, then in step S3601, the halftone processing unit 3405 inputs 8-bit pixel data to be processed.

Next, in step S3602, the cumulative error addition unit 2002 adds a cumulative error that corresponds to the target pixel position, which is stored in the cumulative error memory 2007, to the input pixel data.

In step S3602, the cumulative error addition unit 2002 adds a cumulative error E (x) value that corresponds to the horizontal position x (0<x≤W) of the pixel to the input pixel data. More specifically, "I" represents pixel data input through the input terminal 2001 and "I'" represents the cumulative error added data obtained in step 3602, the following relationship is satisfied.

$$I'=I+E(x) \quad (56)$$

In the following step S3603, the quantization unit 2004 performs quantization processing by comparing the cumulative error added data I' and the threshold input via the threshold setting terminal 2003. In the present exemplary embodiment, the halftone processing unit 3405 compares the cumulative error added image data I' with a total of eight thresholds to classify the quantized image data into 9 levels and determine an output pixel data value to be supplied to the output terminal 2008. Thus, the output gradation value that corresponds to the pixel data received from the cumulative error addition unit 2002 can be determined by the following formulae.

$$O=0 \ (I'<16) \quad (57)$$

$$O=32 \ (16\le I'<48) \quad (58)$$

$$O=64 \ (48\le I'<80) \quad (59)$$

$$O=96 \ (80\le I'<112) \quad (60)$$

$$O=128 \ (112\le I'<144) \quad (61)$$

$$O=160 \ (144\le I'<176) \quad (62)$$

$$O=192 \ (176\le I'<208) \quad (63)$$

$$O=224 \ (208\le I'<240) \quad (64)$$

For convenience in the following description, the output gradation value O is referred to as level 0 if O=0, as level 1 if O=32, as level 2 if O=64, as level 3 if O=96, as level 4 if O=128, as level 5 if O=160, as level 6 if O=192, as level 7 if O=224, and level 8 if O=225.

Through the above-described procedure, the quantization unit 2004 completes the quantization processing for all colors.

Next, in step S3604, the cumulative error addition unit 2005 calculates a quantization error E based on the cumulative error added pixel data I' and the output pixel value O according to the following formula.

$$E=I'-O$$

Further, instep S3605, the error diffusion unit 2006 performs error diffusion processing, with reference to the position x of the target pixel in the horizontal direction, in the following manner. More specifically, the error diffusion unit 2006 calculates quantization errors to be stored in the storage areas E0 and E(x) according to the following processing and stores the calculated quantization errors in the cumulative error memory. In each of the following formulae, an arrow represents substitution calculation.

$$E(x+1) \leftarrow E(x+1)+E\times 7/16 \ (x<W) \quad (65)$$

$$E(x-1) \leftarrow E(x-1)+E\times 3/16 \ (x>1) \quad (66)$$

$$E(x) \leftarrow E0+E\times 5/16 \ (1<x<W) \quad (67)$$

$$E(x) \leftarrow E0+E\times 8/16 \ (x=1) \quad (68)$$

$$E(x) \leftarrow E0+E\times 13/16 \ (x=W) \quad (69)$$

$$E0 \leftarrow E\times 1/16 \ (x<W) \quad (70)$$

$$E0 \leftarrow 0 \ (x=W) \quad (71)$$

Through the above-described procedure, the error diffusion unit 2006 completes the error diffusion processing for one pixel having been input through the input terminal 2001.

In step S3606, the halftone processing unit 3405 determines whether the above-described processing in step S3601 to step S3605 has been thoroughly completed for all pixels of the image. More specifically, the halftone processing unit 3405 determines whether the target pixel (i.e., input pixel) has reached the final position (i.e., the pixel 2102 illustrated in FIG. 21). If it is determined that the target pixel has not yet reached the final position (NO in step S3606), the halftone processing unit 3405 shifts the target pixel to the next one in the arrow direction.

Then, the processing returns to step S3601. If it is determined that the processing has been completed for all pixels (YES in step S3606), the halftone processing unit 3405 completes the halftone processing illustrated in FIG. 36. As a result, the 256-valued color material amount signals (C, M, Y, K) output from the color separation unit 3405 can be converted into 9-valued signals (C', M', Y', K') by executing the above-described processing for each of C, M, Y, and K colors.

The method employed to perform 9-valued quantization processing in the present exemplary embodiment is the error diffusion method. However, for example, it is also useful to employ the multi-valued dither method to perform the 9-valued quantization processing. The halftone processing method is not limited to a particular method.

Further, the K color exclusive processing unit 3402 described in the present exemplary embodiment has a configuration similar to that described in the second exemplary embodiment. However, the K color exclusive processing unit 3402 can be configured to have a configuration described in the first exemplary embodiment. In this case, the halftone processing unit 2802 can be replaced by the halftone processing unit 1606 described in the first exemplary embodiment. Further, similar to the first exemplary embodiment, the halftone processing unit 1606 sends its output to the pass separation unit 1609 without passing through the dot layout patterning processing unit 2803.

As described above, switching the control for determining whether to arrange the black color material data and the chromatic color material data exclusively is effective to prevent the graininess from reducing and enlarge the color gamut of a dark portion.

The halftone processing described in the first to third exemplary embodiments is based on the error diffusion method. However, the halftone processing is not limited to the error diffusion method as described above. For example, the dither method is employable to realize the quantization processing. In view of the foregoing, example halftone processing based on the dither method is described in a fourth exemplary embodiment. The image forming system according to the fourth exemplary embodiment has a system configuration similar to that described in the first exemplary embodiment, except for the configuration relating to the halftone processing unit, and, therefore, the descriptions of the similar components or portions are not repeated.

First, a dark portion color gamut (i.e., a black ink recording region) is described below. FIGS. 38A and 38B illustrate dither matrices usable according to the dither method, each of which is a threshold group that can be referred to when the layout of each dot is determined. FIG. 38A is a dither matrix dedicated to the black ink. FIG. 38B is a dither matrix commonly used for all color inks.

As is understood from the comparison between FIG. 38A and FIG. 38B, the dither threshold group defined by the dither matrix dedicated to the black ink and the dither threshold group defined by the dither matrix dedicated to the color inks are in a mutually reversed layout order relationship at a predetermined area of a recording medium. Employing the above-described reversed order matrices is useful in realizing an exclusive arrangement of the black ink and the color inks. For convenience in the following description, the 4×4 matrix is used as an example of the predetermined area of the recording medium as illustrated in FIGS. 38A and 38B.

However, to suppress undesirable periodicity, it is desired to prepare a larger matrix (for example, having a size of 256×256). FIG. 39 illustrates example layouts corresponding to K=10/16, C=6/16, M=0/16, and Y=4/16, respectively. As is understood from FIG. 39, the black ink and the color inks can be arranged exclusively and further the Y dot (small in ink amount) is constantly overlapped with the C dot (large in ink amount) when the dither matrices illustrated in FIGS. 38A and 38B are employed.

Next, a bright portion color gamut where no black ink is recorded is described below. In the present exemplary embodiment, the bright portion includes three divided areas (i.e., area 1, area 2, and area 3) as indicated on the a*-b* plane of the CIELab color space illustrated in FIG. 40. The area 1 extends from the magenta hue to the yellow hue. The area 2 extends from the yellow hue to the cyan hue. The area 3 extends from the cyan hue to the magenta hue. In general, when the basic colors of an image forming apparatus are C, M, Y, and K, the magenta ink and the yellow ink are mainly used in the area 1. Similarly, the yellow ink and the cyan ink are mainly used in the area 2. The cyan ink and the magenta ink are mainly used in the area 3.

FIGS. 41A, 41B, 41C, and 41D illustrate example dither matrices that can be applied to the bright portion color gamut. The dither matrix illustrated in FIG. 41A is similar to the dither matrix illustrated in FIG. 38A and usable for the black ink irrespective of the area, although not substantially used. The dither matrices illustrated in FIG. 41B, FIG. 41C, and FIG. 41D are usable for the color inks. The dither matrices illustrated in FIG. 41B and FIG. 41C are in a mutually reversed order relationship. The dither matrices illustrated in FIG. 41D and FIG. 41B are in a mutually out-of-phase relationship.

Figure 40:
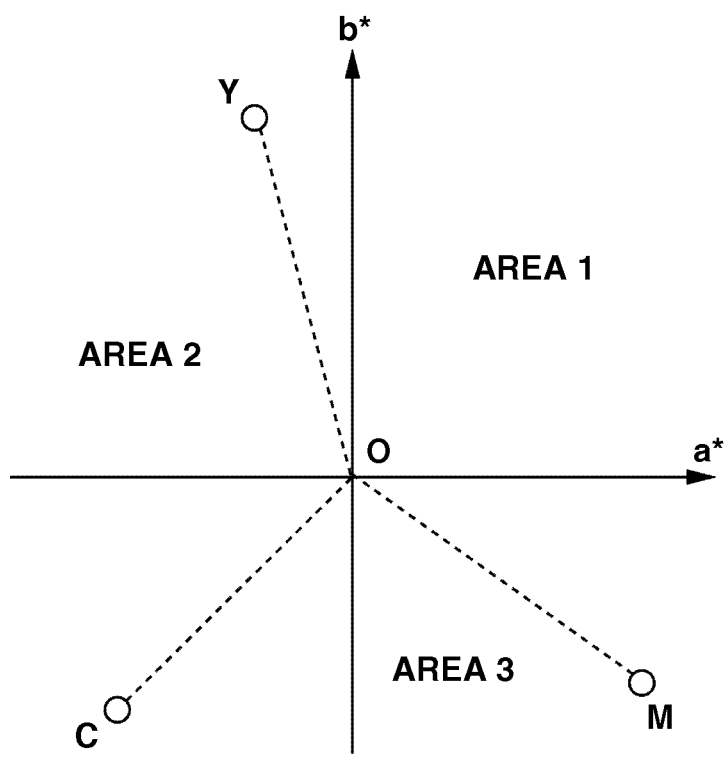
FIG. 40 is a graph illustrating a plurality of areas, in which the combination of dither matrices applied to a bright portion is switched, on the a*-b* plane of the CIELab color space according to the fourth exemplary embodiment of the present invention.

An example method for applying the dither matrices illustrated in FIGS. 41A, 41B, 41C, and 41D to each area illustrated in FIG. 40 is described below. In the area 1 illustrated in FIG. 40, the dither matrix illustrated in FIG. 41B is applied to the magenta ink, the dither matrix illustrated in FIG. 41C is applied to the yellow ink, and the dither matrix illustrated in FIG. 41D is applied to the cyan ink. In the area 2 illustrated in FIG. 40, the dither matrix illustrated in FIG. 41B is applied to the yellow ink, the dither matrix illustrated in FIG. 41C is applied to the cyan ink, and the dither matrix illustrated in FIG. 41D is applied to the magenta ink. In the area 3 illustrated in FIG. 40, the dither matrix illustrated in FIG. 41B is applied to the cyan ink, the dither matrix illustrated in FIG. 41C is applied to the magenta ink, and the dither matrix illustrated in FIG. 41D is applied to the yellow ink. Accordingly, the inks mainly used in each area can be prevented from being mutually overlapped.

FIG. 42 illustrates example layouts corresponding to K=0/16, C=8/16, M=0/16, and Y=8/16, respectively. As is understood from FIG. 42, the color inks can be arranged exclusively when the dither matrices illustrated in FIGS. 41A, 41B, 41C, and 41D are employed. Although the accuracy may not be lowered, the color ink can be partly overlapped with black ink.

To simplify the description, the present exemplary embodiment has been described based on Bayer type dither matrices. However, the dither matrix is not limited to the above-described Bayer type. For example, a conventionally known method (e.g., blue noise mask method) can be used. Further, a binary image to be obtained is not limited to the image relevant to blue noise characteristics and, therefore, can be, for example, a binary image relevant to green noise characteristics.

The first to fourth exemplary embodiments have been described based on the exclusive arrangement of the black ink and color inks. However, in a case where the dot impact position fluctuates in response to a variation in paper feeding amount, it may be desired that the above-described exclusive control is not performed because undesirable variation in lightness can be suppressed. In view of the foregoing, an image forming system according to a fifth exemplary embodiment is configured to control the rate of pixels for which the exclusive control is performed. In other words, the image forming system according to the fifth exemplary embodiment does not perform the exclusive control for some of the pixels. The image forming system according to the fifth exemplary embodiment has a system configuration similar to that described in the first exemplary embodiment, except for the halftone processing unit, and, therefore, the descriptions of the similar components or portions are not repeated.

Figure 44:
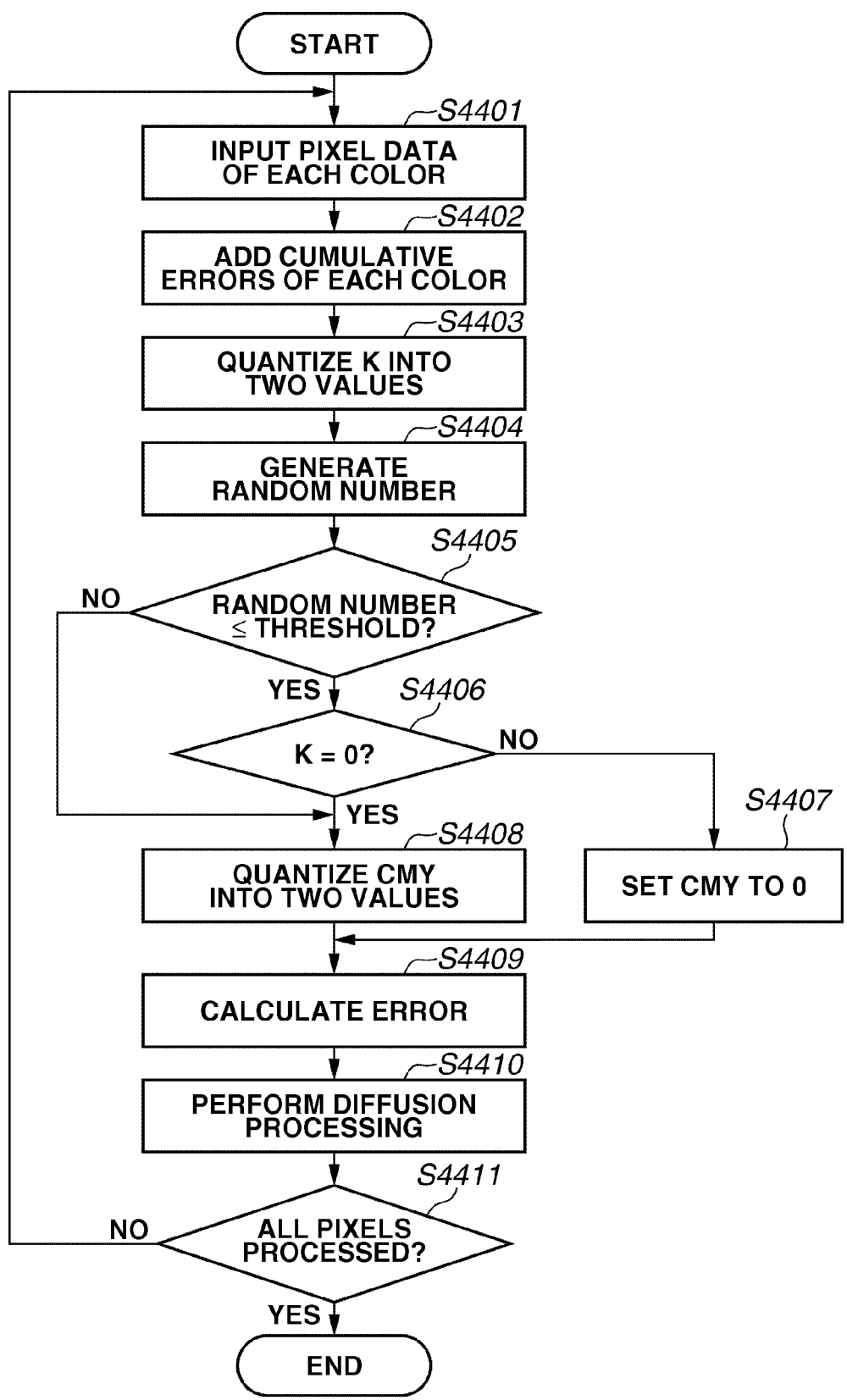
FIG. 44 is a flowchart illustrating an example operation that can be performed by a halftone processing unit according to a fifth exemplary embodiment of the present invention.

FIG. 44 is a flowchart illustrating an example operation that can be performed by the halftone processing unit 1606 according to the present exemplary embodiment. Processing to be performed in step S4401 to step S4403 is similar to the above-described processing performed in step S2201 to step S2203 and, therefore, the description thereof is not repeated.

In step S4404, a random number generator generates a pseudo random number. The random number generated in step S4404 is, for example, any one of integer numbers 0 to 1024. In this case, it is desired that the random number generator can generate each value at a uniform probability.

Next, in step S4405, the halftone processing unit 1606 compares the random number generated in step S4404 with a predetermined threshold. If it is determined that the generated random number is equal to or less than the threshold (YES in step S4405), the processing proceeds to step S4406. If it is determined that the generated random number is greater than the threshold (NO in step S4405), the processing proceeds to step S4408. The threshold is, for example, an integer number that the random number generator can generate.

When the threshold is larger, the rate of pixels to be subjected to the exclusive control for the black and color inks becomes higher. If the threshold value is equal to ¾ of the maximum value that can be generated by the random number generator, the rate of the pixels to be subjected to the exclusive control is 75%. It is desired to set the threshold value to be equal to or greater than 512 because the exclusive control can be applied to at least a half of the pixels. However, the rate of the pixels to be subjected to the exclusive control is not always required to be equal to or greater than a half. The threshold can be a value having been set beforehand, or can be acquired from a user. Further, the threshold can be set based on an output value of a sensor included in the image forming apparatus.

Processing to be performed in step S4406 to step S4411 is similar to the above-described processing performed in step S2204 to step S2209 and, therefore, the description thereof is not repeated.

The image formed in the present exemplary embodiment is characterized in that the rate of color dots overlapped with black dots is between the rate in the random layout not performing the exclusive control and the rate in a layout subjected to the exclusive control. The rate in the random layout not performing the exclusive control can be calculated using the Neugebauer equations, as described above. Further, the black dot is not overlapped with the color dot when the exclusive control is performed, and, therefore the rate is equal to 0.

More specifically, the image forming apparatus according to the present exemplary embodiment can control the rate of the color dots to be overlapped with the black dots according to the threshold value in such a way as to be lower than the rate calculated using the Neugebauer equations. In other words, the rate of the black dots and the color dots arranged exclusively on the recording medium is higher than the rate of the black dots and the color dots arranged exclusively on the recording medium calculated using the Neugebauer equations.

As described above, the image forming system according to the present exemplary embodiment can enlarge the color gamut while suppressing the variation in lightness, even in a case where the dot impact position fluctuates.

The resolution conversion method is not limited to the bi-cubic convolution. Further, it is desired that the converted resolution matches the dot layout on a recording medium.

Figure 37:
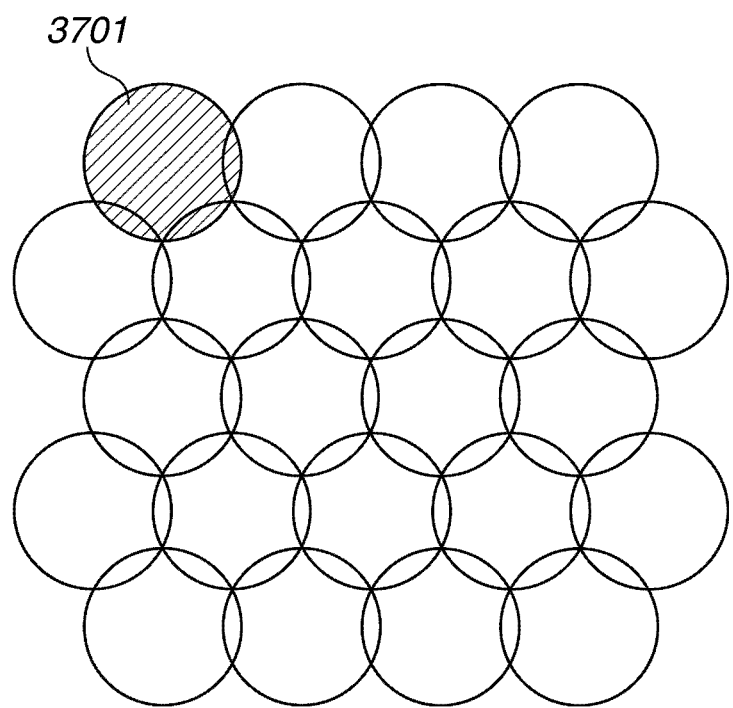
FIG. 37 schematically illustrates an example pixel layout according to an exemplary embodiment of the present invention.

Further, it is desired that the dot of a pixel are not overlapped with the dot of another pixel without providing any clearance between these dots on the recording medium. FIG. 37 schematically illustrates an example pixel layout, according to which a plurality of pixels 3701 are arranged densely on a recording medium. When the pixel layout illustrated in FIG. 37 is used, the resolution conversion unit can calculate (interpolate) the color signal at each pixel position based on the input image data.

The exemplary embodiment has been described based on a 4-pass recording configuration. However, the number of main scanning operations is not limited to four and can be two or eight.

Further, the present exemplary embodiment can be effectively applied to a full-line type inkjet printer, which does not perform main scanning operations.

Further, the present exemplary embodiment can be applied to any other recording type image forming apparatus, such as an electrophotographic printer or a sublimation type printer. In this case, the ink serving as a recording material can be replaced by toner or ink ribbon. Further, the exemplary embodiment has been described based on the example combination of the image forming system and the host computer. However, an image forming apparatus according to another exemplary embodiment can be configured as an image output terminal of an information processing device (e.g., a computer). Further, the image forming apparatus according to another exemplary embodiment can be configured as a copying machine combined with a reader or a facsimile apparatus having transmission/reception capabilities.

An image forming apparatus according to another exemplary embodiment can mount any other type of ink (recording material or color material) that is different from the black ink (black color material) and the C, M, and Y chromatic color inks described in the first to fourth exemplary embodiments. For example, the image forming apparatus can mount a gray ink (gray color material) that is relatively high in lightness compared to the black ink or a light color ink (light color material) that is relatively high in lightness compared to the basic chromatic color inks.

In this case, the black ink and the non-black inks are arranged exclusively and the number of non-black inks to be recorded exclusively is equal to or less than one color. Further, the above-described exemplary embodiment can be applied to a gray ink if the gray ink can reproduce high-density black color that is comparable to the black ink. Further, a light gray color ink is usable as a chromatic color ink. Further, in a case where there are two types with respect to the black ink to be mounted on a printer, it is feasible to apply the above-described exemplary embodiment to only one of two black inks.

Further, to realize the present invention, a storage medium that stores software program codes capable of realizing the functions (e.g., the processing to be performed in respective steps of the above-described flowcharts) of the above-described exemplary embodiments can be supplied to a system or an apparatus. In this case, a computer (or a CPU or a micro-processing unit (MPU)) of the system or the apparatus reads and executes the program codes loaded from a computer-readable storage medium to realize the functions of the above-described exemplary embodiments.

As described above, the system described in each exemplary embodiment of the present invention can enlarge the color gamut of a low-lightness region without adding a new recording material.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-125343 filed Jun. 3, 2011, which is hereby incorporated by reference herein in its entirety.

What is claimed is:

1. An image forming apparatus configured to form an image on a recording medium using a black color material and a plurality of chromatic color materials, the image forming apparatus comprising:
 a generation unit configured to generate black color material data for arranging a dot of the black color material on the recording medium and a plurality of pieces of chromatic color material data for arranging a dot of the plurality of chromatic color materials on the recording medium, based on input image data; and
 a formation unit configured to form an image on the recording medium using the black color material and the plurality of chromatic color materials based on the black color material data and the plurality of pieces of chromatic color material data,
 wherein the generation unit is configured to generate the plurality of pieces of chromatic color material data, for each color positioned at a surface of a dark portion reproduced using the black color material and two color materials among the plurality of chromatic color materials in a color gamut that can be reproduced using the black color material and the plurality of chromatic color materials, in such a way as to set the number of specific colors of the plurality of chromatic color materials having one or more dots arranged exclusively with dots of other chromatic color materials on the recording medium to be equal to or less than one color among colors corresponding to each of the plurality of chromatic color materials by arranging the dots to be partially overlapped or by overlapping the dots of the plurality of chromatic colors other than the one or more dots of the specific chromatic color which are exclusively arranged.

2. The image forming apparatus according to claim 1,
 wherein the input image data includes black color material amount data that corresponds to the black color material and a plurality of pieces of chromatic color material amount data that correspond to the plurality of chromatic color materials, and
 wherein a sum of a value of the black color material amount data corresponding to the color positioned at the surface and a maximum value of values of the plurality of pieces of chromatic color material amount data corresponding to the color is equal to a maximum value of the input image data.

3. The image forming apparatus according to claim 1, wherein the image forming apparatus is configured to form an image on the recording medium using the black color material, the plurality of chromatic color materials, and a gray color material having a lightness value higher than that of the black color material.

4. The image forming apparatus according to claim 3, wherein at least one of: (i) dots for the black color material are arranged exclusively from the dots of the plurality of chromatic color materials and from dots of the gray color material; (ii) dots for the black color material are arranged exclusively from the dots of the plurality of chromatic color materials and from dots of the gray color material such that the dots for the black color material partially overlap, or are not completely overlapped, with or by the dots of the plurality of chromatic color materials and/or the dots of the gray color material; and (iii) dots for the black color material are arranged exclusively from the dots of the plurality of chromatic color materials and from dots of the gray color material regardless of whether the dots for the black color material partially overlap with/by, or do not partially overlap with/by, the dots of the plurality of chromatic color materials and/or the dots of the gray color material.

5. The image forming apparatus according to claim 4, wherein the plurality of chromatic color materials and the gray color material define non-black color materials, and a number of specific colors of the non-black color materials having one or more dots arranged exclusively with dots of other non-black color materials on the recording medium is equal to or less than one.

6. The image forming apparatus according to claim 1, wherein the generation unit is configured to generate the black color material data in such a way as to arrange dots of the black color material in a concentrated manner on the recording medium.

7. The image forming apparatus according to claim 6, wherein the dots of the black color material are in a concentrated manner when no clearance or space exists therebetween.

8. The image forming apparatus according to claim 1, wherein a value of the black color material data corresponding to the color positioned at the surface is greater than any one of values of the plurality of pieces of chromatic color material data corresponding to the color.

9. The image forming apparatus according to claim 1, wherein the generated chromatic color material data of the chromatic color material whose one or more dots are arranged exclusively with dots of other chromatic color materials on the recording medium has the largest color material amount data among the plurality of pieces of chromatic color material data.

10. The image forming apparatus according to claim 1, wherein the exclusively arranged dots of the specific chromatic color material are not adjacent to each other.

11. The image forming apparatus according to claim 1, wherein dots for the black color material do not overlap with, and/or do not mutually overlap with, the dots of the plurality of chromatic color materials.

12. The image forming apparatus according to claim 1, wherein at least one of: (i) dots for the black color material and the dots of the plurality of chromatic color materials are arranged exclusively; (ii) dots for the black color material and the dots of the plurality of chromatic color materials are arranged exclusively such that the dots for the black color material and the dots of the plurality of chromatic color materials are partially overlapped or are not completely overlapped; and (iii) dots for the black color material and the dots of the plurality of chromatic color materials are arranged exclusively regardless of whether the dots for the black color material and the dots of the plurality of chromatic color materials partially overlap or not.

13. The image forming apparatus according to claim 1, further comprising a determination unit that operates to determine whether to arrange dots for the black color material and the dots of the plurality of chromatic color materials exclusively or non-exclusively with each other.

14. The image forming apparatus according to claim 1, wherein the image has no pixel where white paper is exposed or where the image is blank or has no color(s) disposed therein or thereon.

15. The image forming apparatus according to claim 1, wherein the generation unit is further configured to identify or determine each color positioned at a surface of a dark portion of the color gamut.

16. The image forming apparatus according to claim 1, wherein a dot is exclusively arranged if a center of the dot is not overlapped with a center of another of the dots.

17. The image forming apparatus according to claim 1, wherein one or more other dots of the specific chromatic color material overlap, or partially overlap, dots of the other chromatic color materials.

18. An image forming method for forming an image on a recording medium using a black color material and a plurality of chromatic color materials, the image forming method comprising:

generating black color material data for arranging a dot of the black color material on the recording medium and a plurality of pieces of chromatic color material data for arranging a dot of the plurality of chromatic color materials on the recording medium, based on input image data;

forming an image on the recording medium using the black color material and the plurality of chromatic color materials based on the black color material data and the plurality of pieces of chromatic color material data; and generating the plurality of pieces of chromatic color material data, for each color positioned at a surface of a dark portion reproduced using the black color material and two color materials among the plurality of chromatic color materials in a color gamut that can be reproduced using the black color material and the plurality of chromatic color materials, in such a way as to set the number of specific colors of the plurality of chromatic color materials having one or more dots arranged exclusively with dots of other chromatic color materials on the recording medium to be equal to or less than one color among colors corresponding to each of the plurality of chromatic color materials by arranging the dots to be partially overlapped or by overlapping the dots of the plurality of chromatic colors other than the one or more dots of the specific chromatic color which are exclusively arranged.

19. A non-transitory computer-readable storage medium storing a program that causes a computer to perform the method according to claim 18.

20. The image forming method according to claim 18, further comprising identifying or determining each color positioned at a surface of a dark portion of the color gamut.

21. The image forming method according to claim 18, wherein a dot is exclusively arranged if a center of the dot is not overlapped with a center of another of the dots.

22. The image forming method according to claim 18, wherein one or more other dots of the specific chromatic color material overlap, or partially overlap, dots of the other chromatic color materials.

* * * * *